United States Patent [19]

Norrell et al.

[11] Patent Number: 5,892,757
[45] Date of Patent: Apr. 6, 1999

[54] ASYMMETRIC DUPLEX MODEM UTILIZING NARROW BAND ECHO CANCELLATION

[75] Inventors: Andrew L. Norrell, Nevada City; Christopher R. Hansen, Grass Valley, both of Calif.

[73] Assignee: U.S. Robotics Access Corp., Skokie, Ill.

[21] Appl. No.: 713,134

[22] Filed: Sep. 16, 1996

Related U.S. Application Data

[63] Continuation of Ser. No. 193,730, Feb. 9, 1994, Pat. No. 5,579,305.

[51] Int. Cl.⁶ ................................................. H04B 3/23
[52] U.S. Cl. ........................ 370/292; 375/222; 379/410
[58] Field of Search ........................... 370/252, 282, 370/286, 292; 375/222, 231; 379/406, 410

[56] References Cited

U.S. PATENT DOCUMENTS

| | | | |
|---|---|---|---|
| 5,007,047 | 4/1991 | Sridhar et al. | 370/286 |
| 5,070,514 | 12/1991 | Tjahjadi | 375/232 |
| 5,289,459 | 2/1994 | Brownlie | 370/252 |
| 5,394,392 | 2/1995 | Scott | 370/295 |

*Primary Examiner*—Min Jung
*Attorney, Agent, or Firm*—McDonnell Boehnen Hulbert & Berghoff

[57] ABSTRACT

A full-duplex modem having improved transmission speeds over voice grade telephone circuits that extends the concepts of asymmetric transmission to include echo cancellation techniques. The preferred modem has a high speed forward channel and an overlapping low speed back channel and is capable of transmitting or receiving over either of the channels, depending on the relative data rates. A narrow band echo canceler substantially cancels all or part of reflected transmit signals. Because the echo cancellation technique employed is narrow band, there is a significant reduction in the complexity and computational requirements for the modem.

5 Claims, 8 Drawing Sheets

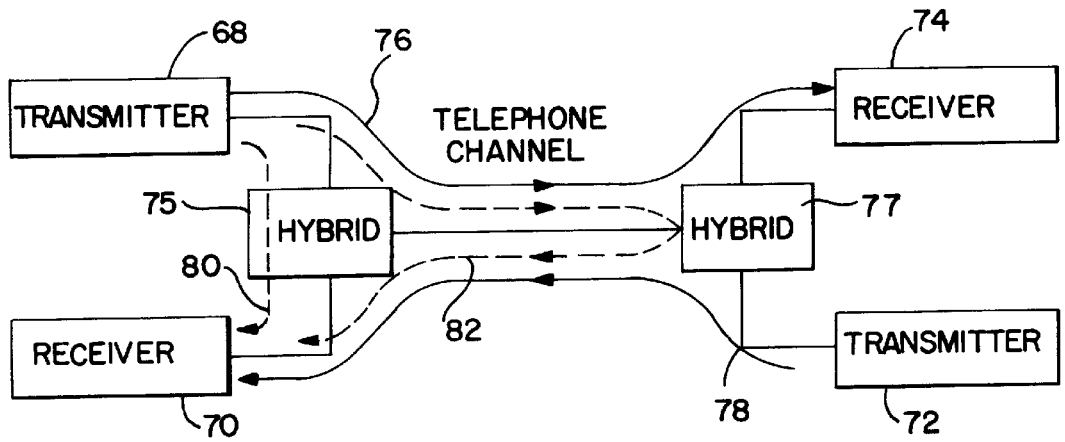
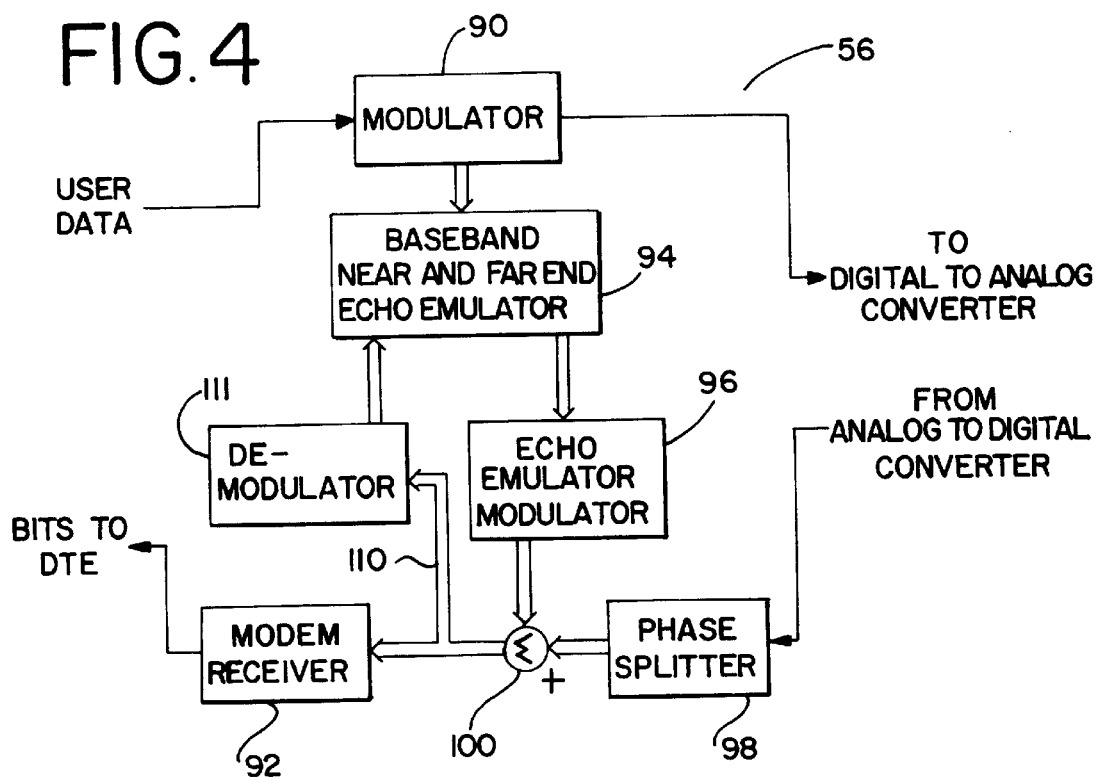

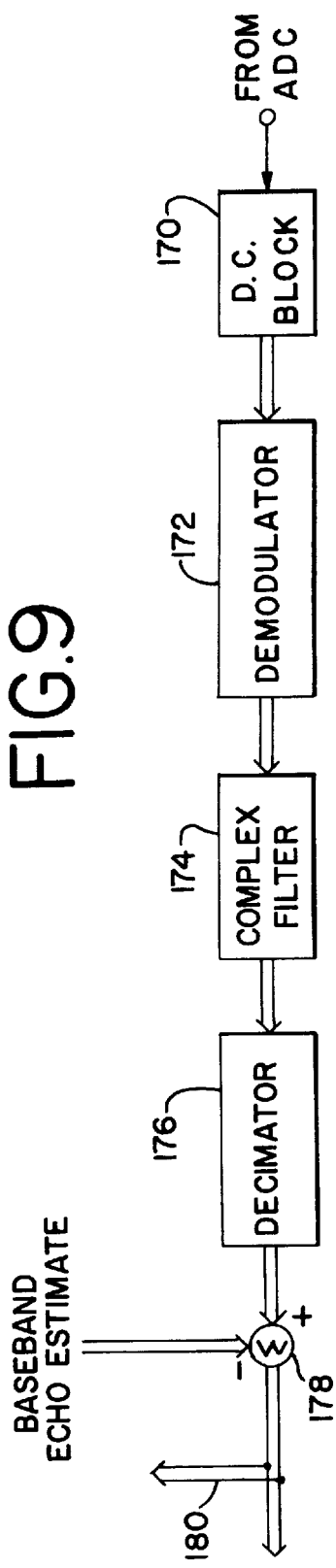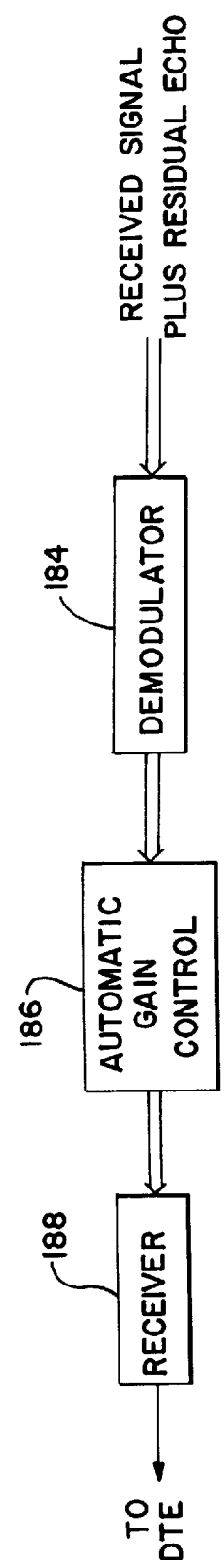

ASYMMETRIC DUPLEX MODEM UTILIZING NARROW BAND ECHO CANCELLATION

This is a continuation of application Ser. No. 08/193,730 filed Feb. 9, 1994 now U.S. Pat. No. 5,579,305.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

This invention relates to digital communication systems and more particularly to an asymmetric duplex modem for communicating at higher speeds over voice-grade, dial-up telephone circuits utilizing narrow band echo cancellation.

Modem designers are continually seeking new ways to increase the transmission speeds of modems. Although arbitrarily high transmission speeds can be attained over special-purpose, wideband transmission circuits, such links are typically unavailable and transmission must accordingly be handled by conventional, voice-grade, dial-up telephone lines. Such standard phone lines, however, have severely limited bandwidth, are subject to line noise, and typically exhibit line irregularities and poor termination, making them echo-prone. These factors severely complicate the task of improving modem transmission speeds over dial-up lines.

Better use of the roughly 3,400 Hertz bandwidth available on the dial-up network has been realized by using advanced modulation and equalization techniques. Modems capable of operating at high speeds, such as those conforming to the CCITT V.32 Bis standard, achieve this by using a modulation method called "quadrature amplitude modulation" (QAM), in which both the amplitude and phase of the signal are modulated. It would, however, normally be impossible for a high speed QAM modem to simultaneously transmit in both directions at the designed speed over voice-grade lines if a technique, called "adaptive equalization," were not used to automatically adjust the modem to the unique characteristics of each phone line encountered.

Another more sophisticated and advanced technique used for high-speed transmission is "trellis coded modulation" (TCM). Trellis coded modulation relies on a special transmit encoding process, which allows transmission at rates that would normally prove unreliable on non-TCM modems. The receiving modem has sufficient intelligence to correct many transmission errors, allowing the modems to communicate at higher speeds for a given error rate. Using trellis coded modulation and adaptive equalization techniques, transmission speeds of 9600 bits per second and higher can be attained.

Another important technique, echo cancellation, allows the forward and reverse channels to overlap. This scheme is found in the CCITT V.32 recommendation for a full-duplex 9600 bit per second modem in which the modem simultaneously receives information over the same frequency band on which it is transmitting. The same scheme is found in the CCITT V.32 Bis recommendation. For a modem to simultaneously receive information over the same frequency band on which it is transmitting, however, each modem must be able to substantially cancel out the "echoes" of its own transmitted signal. Echoes are reflections of the transmit signal typically caused by a discontinuity in the transmission path of the signal, such as an impedance mismatch. V.32 and V.32 Bis use a method called "echo cancellation" to eliminate the reflected transmitted signal. This method involves subtracting a locally synthesized replica of the reflected transmitted signal from the composite received signal. High-speed modems utilizing the CCITT V.32 Bis standard are known to those of ordinary skill in the art and are commonly available. Such modems are made by several firms, including Motorola, Rockwell, AT&T, Penril, General Datacom, Racal Datacom, and U.S. Robotics.

Schemes such as V.32 and V.32 Bis have significant disadvantages, however. One of these disadvantages is due to the fact that such schemes utilize symmetrical data transmission. In symmetrical data transmission, the same bandwidth is used in both the forward and reverse directions, regardless of the relative data traffic requirements. Accordingly, the bandwidth of the echo is the same in both directions, regardless of relative data traffic. This is undesirable for several reasons. First, because of the relatively broad bandwidth of the echo in symmetrical transmissions, modems must achieve a high degree of echo cancellation to substantially eliminate the unwanted echo. Second, it requires a high degree of precision digital arithmetic in the Digital Signal Processor of the modem. Third, separating a wide-band echo from the local receiver signal requires considerable computational power. In addition, separating a wide-band echo from the local receiver with a full power local transmitter requires a high degree of precision in the analog-to-digital and digital-to-analog converters of the modem. Modems utilizing symmetrical transmission spend approximately the same computational power on echo cancellation as on signal demodulation and decoding. Furthermore, the residual echo that cannot be cancelled becomes a major limitation to the local receiver, even if the local transmitter has little or no data traffic, which is often the case. Finally, the V.32 and V.32 Bis standards require the same data rate in both directions. Thus, if two modems are connected over a channel that is more impaired in one direction than the other, the data rate in both directions is limited to the maximum rate in the more impaired direction. Hence, the direction with the lowest channel speed determines the maximum speed for both directions.

Much of the data traffic from one data terminal to another is highly asymmetric in nature. In recognition of this, modems have been developed utilizing asymmetrical data transmission techniques in which the data rates in the forward and reverse directions differ. Asymmetrical transmission is based on the recognition that, while the modem needs to operate interactively in both directions at once, the high-speed data transfer is normally needed in only one direction at a given time. When entire files are being transferred from one location to another, a high-speed channel is needed in that direction while, in the other direction, the data to be sent is normally limited to the combination of the interactive data being keyboarded and the error-control signals needed to confirm the accuracy of the transmission occurring in the high-speed direction.

Examples of modems utilizing asymmetric data transmission to achieve higher transmission speeds are found in U.S. Pat. Nos. 5,008,901 and 4,890,316. In these modems, simultaneous bi-directional transmission occurs over a wide-band, high-speed channel in one direction and a narrow-band, low-speed backchannel in the reverse direction, and the direction of the high-speed channel is dynamically reversed whenever the modem currently transmitting over the back-channel accumulates more than a predetermined maximum backlog of untransmitted data. These inventions use band splitting techniques to achieve the simultaneous, bi-directional transmission of the data Under band splitting, each channel has its own assigned band of frequencies. Because the channels are non-overlapping, the receiver can use analog or digital filters to separate the received signal from the echo. In such a system, an echo cancellation mechanism is not necessary. The drawback to using band splitting, however, is that it takes part of the already limited available bandwidth of a dial-up telephone circuit, and assigns it to the low-speed channel. Thus, the bandwidth available for use by the high speed channel is reduced.

SUMMARY OF THE INVENTION

It is therefore a general object of the present invention to provide an improved modem capable of dependable, high-speed performance at low cost. It is a more particular object to increase the transmission capability of a modem by using narrow band echo cancellation techniques, without dramatically increasing the cost and complexity of the modem.

The technique of the present invention pairs a narrow band, low speed transmitter and a wideband, high speed receiver in a modem at one end of a communication link. At the opposite end of the link is a modem having a wideband, high speed transmitter and a narrow band, low speed receiver. In addition, each modem includes an echo canceler. The echo canceler associated with the high speed receiver cancels both the near-end and far-end echo. The echo canceler associated with the low speed receiver cancels only the near-end echo.

This technique offers several significant advantages over other transmission schemes utilizing echo cancellation, such as V.32 and V.32 Bis. The asymmetrical nature of the forward and reverse channels means that echo cancellation is required over only a relatively narrow band of frequencies. At the high speed receiver end, the transmitter is narrow band. Accordingly, the reflected transmitted signal, i.e. the echo, is also narrow band and therefore relatively non-dispersive. Thus, the associated echo canceler need only be capable of cancelling a narrow band echo. In addition, the narrow band transmitter's echo can be minimized by choosing a carrier frequency that falls in the part of the phone band where the network and modem hybrids are best balanced.

At the opposite, high speed transmitter end, the transmitted signal is wide band. The associated receiver at this end, however, is narrow band. Thus, even though the reflected transmitted signal (the echo) is wide band, the only portion of the echo that must be cancelled is that portion occupying the narrow bandwidth over which the narrow band receiver is receiving a signal.

Another advantage of using narrow band echo cancellation is that the technique improves the training time of the modem. During the initial handshaking procedure between modems, the echo canceler can train very quickly, and requires very few active taps per sample period because of the low symbol rate. Further, the low symbol rate also means that the bulk delay buffer associated with the far end echo canceler requires very little storage.

Because the data rates of the modems are asymmetric, the transmitter powers can also be asymmetric. Hence, the low speed transmitter requires relatively low power as compared with the high speed transmitter. This reduces the required precision for the analog-to-digital and digital-to-analog converters. In addition, the lower transmit power at the high speed receiver end makes it possible to ignore the far-end echo problem during the initial training phase. This has the effect of allowing the far-end echo canceler to be trained during data transmission, which greatly reduces the initial training time. Thus, data transmission can begin with less training time delay. The data rate is increased accordingly as the optimization of the far-end canceler proceeds.

A far-end echo canceler is not required at the high-speed transmitter end. This is because a simple constellation is used for the backward channel signal, and because this signal on the reverse channel occupies a small fraction of the forward channel's bandwidth. This technique is especially suited to channels where far end echo cancellation is not possible, such as r.f. channels, where the far echo path varies rapidly.

Echo canceler computational loads are also dramatically reduced, especially at the high speed receiver end, where computational power is already in short supply. Using the narrow band echo cancellation technique, a modem having a 28,800 bit per second forward channel and a 1067 bit per second backward channel can be built with the same computational power as a 14,400 bit per second V.32 Bis modem.

It is a further object of this invention to provide quicker methods for training modems. The improved methods lessen the time associated with modem training by taking advantage of stored echo canceler and receiver states.

BRIEF DESCRIPTION OF THE DRAWINGS

A preferred embodiment of the present invention is described herein with reference to the drawings wherein:

FIG. 3 is a simple block diagram illustrating the basic paths of reflected transmitted signals in the public telephone network;

FIG. 4 depicts in more detail the data pump seen at 56 in FIG. 2;

FIG. 9 depicts in more detail the band limited phase splitter/demodulator seen at 152 in FIG. 7;

FIG. 10 depicts in more detail the baseband receiver/equalizer seen at 154 in FIG. 7;

DETAILED DESCRIPTION OF THE PREFERRED EMBODIMENT

Figure 1:
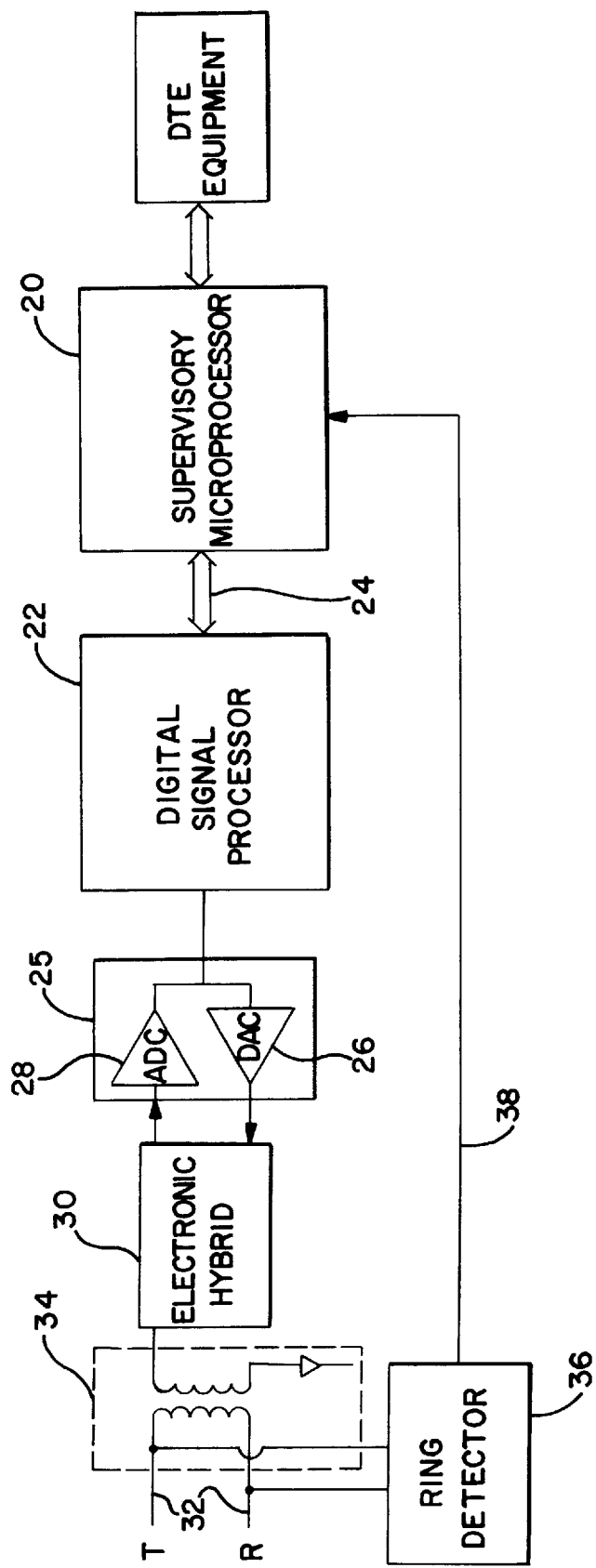
FIG. 1 is a block diagram illustrating the general hardware architecture of a preferred high-speed modem which embodies the principles of the present invention.

Referring to FIG. 1 of the drawings, the preferred modem comprises two independent digital processors 20, 22. The supervisory microprocessor 20 controls processor 22. The processor 22, called the "DSP" (Digital Signal Processor), is controlled by the supervisory microprocessor 20.

The two processors 20, 22 advantageously take the form of readily available microprocessors. Supervisory microprocessor 20 may be implemented using a conventional processor supported by read only memory for program storage and by dynamic random access memory for buffering data and for storing process variables. DSP 22 bears the greater computational burden of the two processors and is preferably implemented with a TMS 320-C51 high-speed 16-bit fixed point arithmetic processor operating at a clock speed of 32.256 megahertz. The arithmetic capabilities of this device and its high clock speed allow it to decode a 28,800 bit per second trellis-coded signal when the modem is receiving data at its highest-rated speed. The processor which implements the supervisory microprocessor function also operates at 32.356 megahertz.

The supervisory microprocessor 20 and the DSP 22 are coupled as illustrated by the bus 24 shown in FIG. 1. The two processors exchange information via their respective I/O ports via the bus 24.

The DSP 22 sends and receives signal information by way of an analog interface circuit 25. The DSP 22 is connected via a serial bus to the input of a conventional 14-bit digital-to-analog converter (DAC) seen at 26 in FIG. 1. The DSP 22 is also connected via a serial bus to the output of an analog-to-digital converter (ADC) 28. The ADC 28 is a 14-bit analog-to-digital converter of conventional design and has its input connected to the electronic hybrid 30.

The DSP 22 is connected to the telephone network (normally a conventional two-wire dial-up telephone tip and ring circuit seen at 32 in FIG. 1) by means of the analog interface circuit 25. The telephone lines are connected (typically by means of a standard RJ11C phone connector) to a telephone line circuit indicated generally as 34 in FIG. 1. The line circuit 34 includes a hybrid transformer and amplifiers for separating the transmitted and received signals and a line relay (not shown) for taking the modem OFF-HOOK (connected) and ON-HOOK (disconnected), and for pulsing the line to provide conventional dial-pulse signalling. A conventional ring detection circuit 36 for detecting ringing signals from the central office which appear across the telephone lines is also shown. The ringing signal is supplied as a network status signal via a control line 38 to the supervisory microprocessor 20, and the OFF-HOOK control signal is supplied to the circuit via another line.

Figure 2:
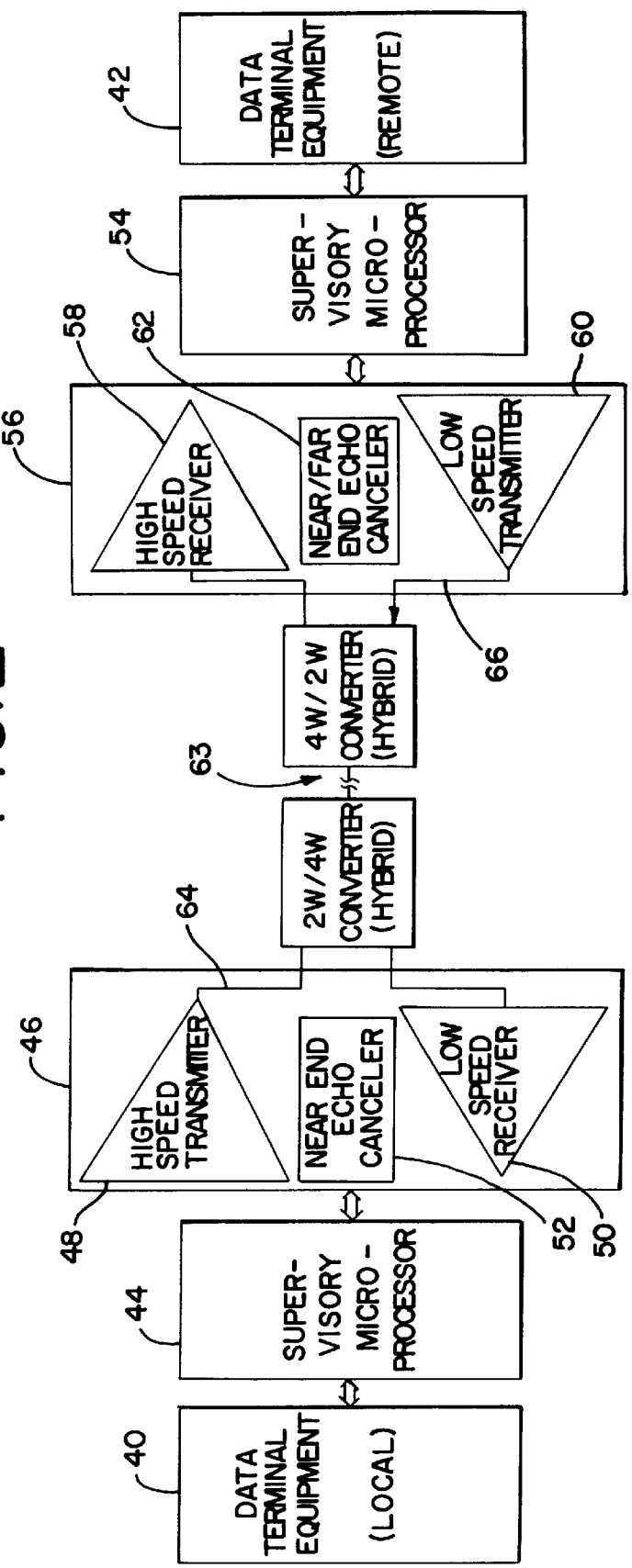
FIG. 2 is a high level diagram of two modems operating in accordance with the principles of the present invention.

The high-level control of the modem is provided by the supervisory microprocessor 20. Before generally describing individual routines and other mechanisms, the overall function of the modem will be summarized. FIG. 2 is a high level diagram of two modems operating in accordance with the principles of the present invention. This drawing depicts a local data terminal 40 communicating with a remote data terminal 42 over a link created by a local modem and a remote modem. The local modem is represented by a supervisory microprocessor 44 and a data pump 46. The data pump 46 has a high speed transmitter 48, low speed receiver 50, and a near end echo canceler 52. The remote modem is represented by a supervisory microprocessor 54 and a data pump 56. The data pump 56 has a high speed receiver 58, low speed transmitter 60 and a near and far end echo canceler 62.

As mentioned previously, the supervisors 44, 54 provide the high-level control over the modems. The data pumps 46, 56 perform the transmitter and receiver functions of the modems. The main task of each transmitter 48, 60 is the conversion of bits from the data terminals 40, 42 into a digital signal which is supplied via a bus to the DAC 26 (FIG. 1). The main task of each receiver 50, 58 is converting the received signal samples from the ADC 28 (FIG. 1) into the bit stream to be sent to the data terminals.

The modem of the present invention is preferably an asymmetrical, full duplex modem. Full duplex means that data is being passed in both directions simultaneously. Asymmetric means that the data rates in the forward and reverse directions are not equal. This is illustrated in FIG. 2, which depicts two modems communicating over a voice grade telephone line 63. The local data pump 46 is transmitting information over a wide-band, high-speed, forward channel 64 while the remote data pump 56 is simultaneously transmitting information over a narrow-band, low-speed, back channel 66. In the preferred embodiment, the data pump 46 is capable of transmitting a signal at 28,800 bits per second over the high-speed channel 64 while the data pump 56 is simultaneously transmitting a signal at 1,067 bits per second over the low-speed channel 66. The frequency spectrum of the back channel 66 overlaps with or can fall completely within the frequency spectrum of the forward channel 64.

As a result of utilizing a narrow band back channel 66, the power of the remote transmitter 60 may be substantially reduced. In the preferred embodiment, for example, the transmission power of the narrow band transmitter 60 is 6 dB below nominal. The substantial reduction in the power of the remote transmitter 60 is possible because the complexity of echo cancellation for the back channel 66 is reduced. The narrow band, back channel signal uses a less complex constellation, and thus is easier to decode. Further, the attenuation and phase distortion of the back channel 66 may be reduced by centering the narrow band near a frequency (such as 1,000 Hertz) where the network and modem hybrid circuits are best balanced. Consequently, less echo is generated by the telephone network. Further, the echo canceler 62 need only be capable of cancelling a narrow band echo.

The forward and back channel configuration depicted generally in FIG. 2 is configured upon call initiation such that the answering modem transmits at high speed and receives at low speed. This assignment is changed dynamically during a call depending on the data traffic pattern. The method for changing the assignment will be discussed in connection with the discussion on modem training.

As mentioned earlier, special methods must be employed for a high-speed modem to simultaneously receive information over the same passband on which it is transmitting. For this to work, each modem must be able to substantially cancel out the echoes of its own transmitted signal. FIG. 3 illustrates in a very basic manner the general concept of how signals transmitted over the public telephone network can be reflected. This simple block diagram depicts a local transmitter 68 and receiver 70 of a modem communicating with a remote transmitter 72 and receiver 74 over a voice grade telephone channel. Two four wire-to-two wire hybrids 75, 77 associated with the public telephone network are also depicted. The local transmitter 68 is transmitting a signal 76 that is being received by the remote receiver 74. Similarly, the remote transmitter 72 is transmitting a signal 78 that is being received by the local receiver 70. As represented in FIG. 3, part of the signal 76 transmitted by the local modem is reflected back at certain points in the telephone channel. The reflected transmit signal is seen at 80. Reflections of a signal in the telephone channel can occur due to any number of reasons, including discontinuities and impedance mismatches in the transmission path. A common source of reflection is the impedance mismatch caused by the hybrids 75, 77.

The reflected transmit signal 80 is referred to as near-end echo. Part of the transmit signal 76 can also be reflected at the remote end of the channel by the other hybrid 77. This reflected transmit signal 82 is referred to as the far-end echo. As FIG. 3 illustrates, both the near-end and far-end echoes 80, 82 are traveling in the same direction and over the same channel as the signal 78 to be received from the remote transmitter 72. If reflected signals 80 and 82 were in the same frequency band as the signal 78 being received by the local receiver 70, they would be passed on to the receiver and corrupt the intended received data stream. This can be prevented by utilizing echo cancellation to cancel echoes 80, 82 before they reach the receiver 70.

The present invention extends the concept of asymmetric transmission to include the echo cancellation technique. Before going into detail, a general explanation of the basic principles of the invention will be provided. Referring again to FIG. 3 for illustration, if the transmit signal 76 is wide-band, then its near and far-end reflections SO and 82 will also be wide-band. The broader the range of frequencies over which the echo must be cancelled, the more complex the echo cancelling mechanism must be. In addition, there is a greater likelihood that some residual echo will not be cancelled and will be passed on to the receiver 70 and corrupt the received data stream. The method of the present invention avoids these problems. To illustrate how, assume that the local transmitter 68 is wide-band and the local receiver 70 is narrow-band. In addition, assume that the remote receiver 74 is wide-band and the remote transmitter 72 is narrow-band. Because the local receiver 70 is concerned with signals over only a narrow band of frequencies, only echoes within this narrow frequency band must be cancelled. Thus, despite the fact that the echo 80, 82 is wide-band (because the local transmitter 68 is wide-band), narrow band echo cancellation can be employed.

Now referring to the remote end in FIG. 3, because the remote transmitter 72 is narrow band, the reflected transmit signal (not shown) is narrow band. Thus, even though the remote receiver 74 is receiving a signal that is wide band, the echo cancellation means associated with the wide band receiver 74 does not need to be capable of operating over this entire wide band. It need only be capable of cancelling the narrow band, reflected transmit signal.

As illustrated by the embodiment depicted in FIG. 2, the modem of the present invention utilizes the technique just described. At one end, the echo canceler 52 is employed in conjunction with a wide-band, high-speed transmitter 48 and a narrow-band, low-speed receiver 50. At the opposite end, the echo canceler 62 is employed in conjunction with a wide-band, high-speed receiver 58 and a narrow-band, low-speed transmitter 60.

Operation of the modem of the preferred embodiment will now be discussed in detail. Referring to FIG. 4, a general block diagram depicts the data pump 56 that was discussed generally in relation to FIG. 2. The data pump 56 illustrated in FIG. 4 is implemented by software in the processors 20, 22 (FIG. 1). The data pump 56 is depicted in a low-speed transmit, high-speed receive mode. That is, the data pump 56 is receiving data over the wide-band, high-speed forward channel 64 and transmitting data over the narrow-band, low speed back channel 66 (FIG. 2).

As depicted in FIG. 4, major components of the data pump 56 are the modulator 90, modem receiver 92, and the baseband near and far-end echo emulator 94. To summarize the general operation of the data pump 56, bits of user data enter the input of the modulator 90. The modulator 90 then converts these bits into a digitized transmitter signal which is then supplied to the digital-to-analog converter 26 (FIG. 1). The modulator 90 also supplies the digitized transmitter signal to the near and far-end echo emulator 94. The echo emulator 94 processes the signal supplied by modulator 90 and generates an estimate of the baseband near and far-end echo. This estimate will eventually be subtracted from the composite received signal (where the composite received signal consists of the intended received signal plus the transmitter echo), thereby substantially cancelling the echo therein. Before this occurs, the baseband echo estimate is converted to a passband signal centered at the transmitter's carrier frequency by the echo emulator modulator 96.

Turning now to the received signal path in the data pump 56, after the composite received signal is converted from analog to digital, it passes through a phase splitter 98. The phase splitter 98 takes the real signal input and produces a complex signal output (represented in FIG. 4 by double lines) without shifting the frequency spectrum of the signal. A substantial portion of the echo in the composite received signal is then cancelled when the passband echo estimate is subtracted from the output of the phase splitter 98 at the summing block 100. The output signal of the summing block 100 thus comprises the intended received signal plus any passband residual echo that was not cancelled.

The output signal of the summing block 100 also serves as the passband echo canceler error term 110. Before being supplied to the near and far-end echo emulator 94, the error term 110 is converted to baseband by the demodulator 111. The error term 110 allows the echo canceler coefficients of the echo emulator 94 to be updated during transmission, which in turn helps to minimize the residual echo. The output of the summing block 100 also passes through the modem receiver 92, which converts the intended received signal into a bit stream to be sent to the data terminal equipment.

Figure 5:
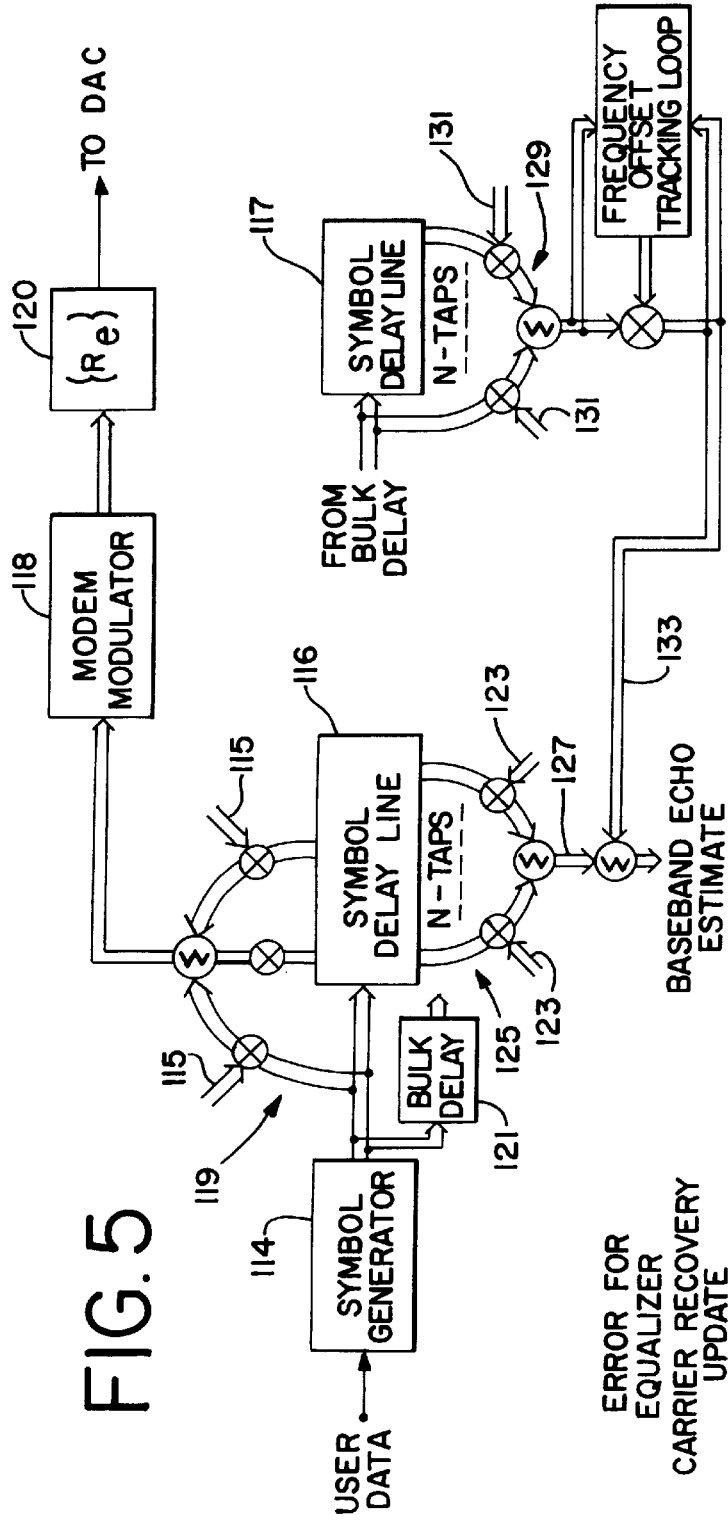
FIG. 5 depicts in more detail the modulator, seen at 90 in FIG. 4, and the near end and far end echo canceler, seen at 94 in FIG. 4.
Figure 6:
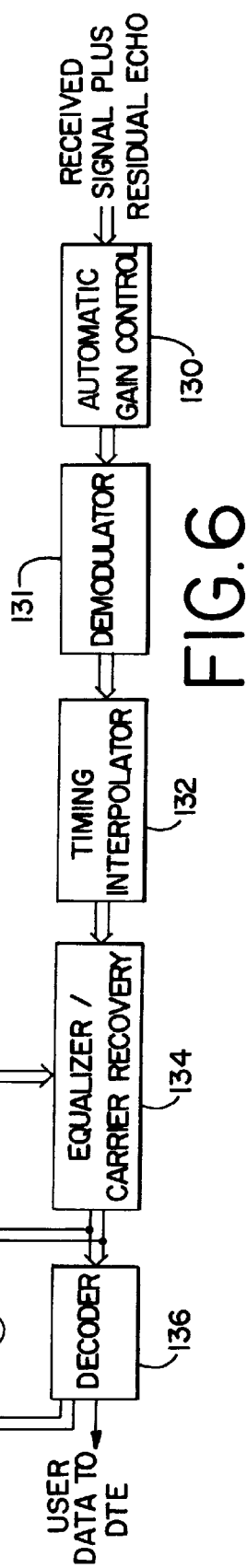
FIG. 6 depicts in more detail the modem receiver seen at 92 in FIG. 4.

For a more detailed explanation of the operation of the data pump 56, reference should now be made to FIGS. 5 and 6. FIG. 5 is a more detailed diagram of the low-speed modulator 90 and the near and far-end echo emulator 94 of the data pump 56. FIG. 6 is a more detailed diagram of the modem receiver 92 of the data pump 56.

Referring first to FIG. 5, the modulator 90 and echo emulator 94 of the data pump 56 include a symbol generator 114, symbol delay lines 116 and 117, modem modulator 118, and a filter element 120.

The symbol generator 114 is conventional and converts the user data at its input to complex transmit symbols. The output of the symbol generator 114 is then sent to a conventional symbol delay line 116 and to the bulk delay element 121. The symbol delay line 116 has a non-adaptive finite impulse response filter 119 and an adaptive finite impulse filter 125. The non-adaptive filter 119 of the symbol delay line 116 filters and bandshapes the spectrum of the transmit signal in the baseband.

As part of the filtering procedure in the non-adaptive filter 119, the transmit signal is multiplied by transmit filter coefficients 115 that are stored in Read Only Memory. The non-adaptive filter 119 generates a filtered transmitter baseband signal at the sample rate at which the digital-to-analog converter is running. In the preferred embodiment, this sample rate is eighteen times higher than the symbol rate of the symbol generator 114. While the filters 119 and 125 of the preferred embodiment are finite impulse response filters, persons of skill in the art will appreciate that other means could be employed to accomplish the same result.

The output of the non-adaptive filter 119 of the symbol delay line 116 is input to the modem modulator 118. The output of the modem modulator 118 is a passband transmitter signal centered at the actual transmit frequency. The filter element 120 then converts the complex transmitter signal into a real signal by eliminating the imaginary component. The output of the filter element 120 is then passed on to the digital-to-analog converter (FIG. 1) for transmission over the public telephone network.

The adaptive filter 125, represented at the lower portion of symbol delay line 116, is associated with the generation of the near end echo estimate 127. The echo canceler coefficients 123 of the adaptive filter 125 are dynamic and are determined in such a manner as to minimize residual echo. During the filtering process, each of the symbols of the symbol delay line 116 is multiplied by an echo canceler coefficient 123. The coefficients 123 are learned during echo canceler training.

The symbol delay line 117 receives a signal from the bulk delay element 121. The delay line 117 has an adaptive filter 129 and is associated with the generation of the far end echo estimate 133. Like the adaptive filter 125, the echo canceler coefficients 131 of the adaptive filter 129 are dynamic and are determined in such a manner as to minimize residual echo. During the filtering process, each of the symbols of the symbol delay line 117 is multiplied by an echo canceler coefficient 131. The coefficients 131 are learned during echo canceler training.

The output of the adaptive filter 129 is input to a far end echo frequency offset compensation loop 135. The near end echo estimate 127 and the far end echo estimate 133 are then summed to produce the baseband echo estimate that is sent to the echo emulator modulator 96 (FIG. 4).

With respect to the actual training of the far end echo canceler, a conventional modem often trains the far end echo canceler prior to transmitting data. In the present invention, however, the far-end echo can simply be ignored during the initial training phase because of the low power at the high speed receiver end. This has the effect of allowing the far-end echo canceler to be trained during data transmission, which greatly reduces the initial training time. Thus, data transmission can begin with less training time delay. The data rate is increased accordingly as the optimization of the far-end echo canceler proceeds.

As indicated in FIG. 2, a far-end echo canceler is not required at the high-speed transmitter end. This is because a simple constellation is used for the backward channel signal, and because the signal on the reverse channel 66 occupies a small fraction of the forward channel's 64 bandwidth, centered in the most benign part of the channel.

Referring now to FIG. 6, the modem receiver 92 includes an automatic gain control element 130, a demodulator 131, a timing interpolator 132, an equalizer/carrier recovery element 134, and a decoder 136.

The output signal of the summing block 100 (FIG. 4), which comprises the intended received signal plus any residual echo, is passed through the conventional automatic gain control element 130 and then demodulated down to baseband by demodulator 131. The output signal of the demodulator 131 is then input to a conventional timing interpolator 132. The output signal of the interpolator 132 is comprised of samples that are synchronized to the far end transmitter. The equalizer/carrier recovery element 134 is conventional and removes inter-symbol interference and carrier frequency offset from the output signal of the timing interpolator 132. Finally, a conventional decoder 136 recovers the user data from the output signal of the equalizer 134. The decoder 136 also generates an error term 137 which is used to update the equalizer/carrier recovery coefficients. In the preferred embodiment, the automatic gain control 130 and the demodulator 131 both operate at the sample rate of the analog-to-digital converter. It is not required, however, that the rates be the same.

Figure 7:
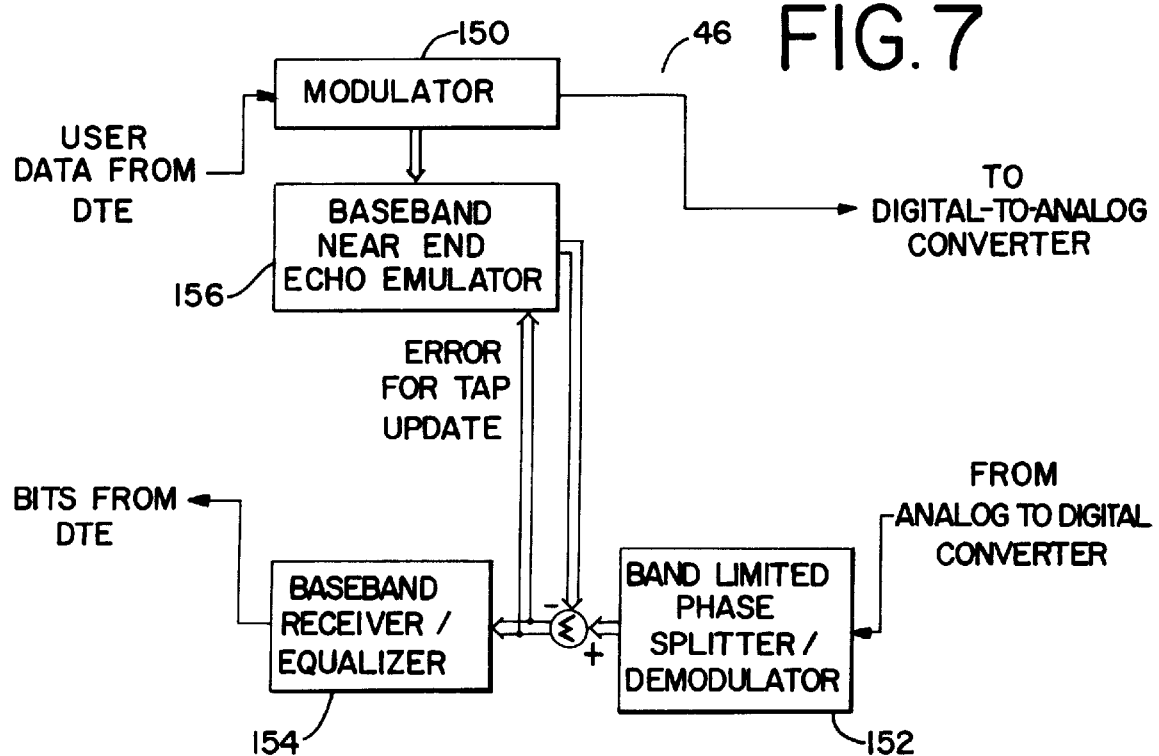
FIG. 7 depicts in more detail the data pump seen at 46 in FIG. 2.

Referring now to FIG. 7, a general block diagram depicts the data pump 46 which was described in connection with FIG. 2. The data pump 46 is transmitting information over the wide-band, high-speed forward channel 64 and receiving data over the narrow-band, low speed back channel 66 (FIG. 2). The major components of the data pump 46 include the modulator 150, the band limited phase splitter/demodulator 152, the baseband receiver/equalizer 154, and the baseband near end echo emulator 156. The general operation of the data pump 46 is basically the same as the data pump 56 depicted in FIG. 4.

Figure 8:
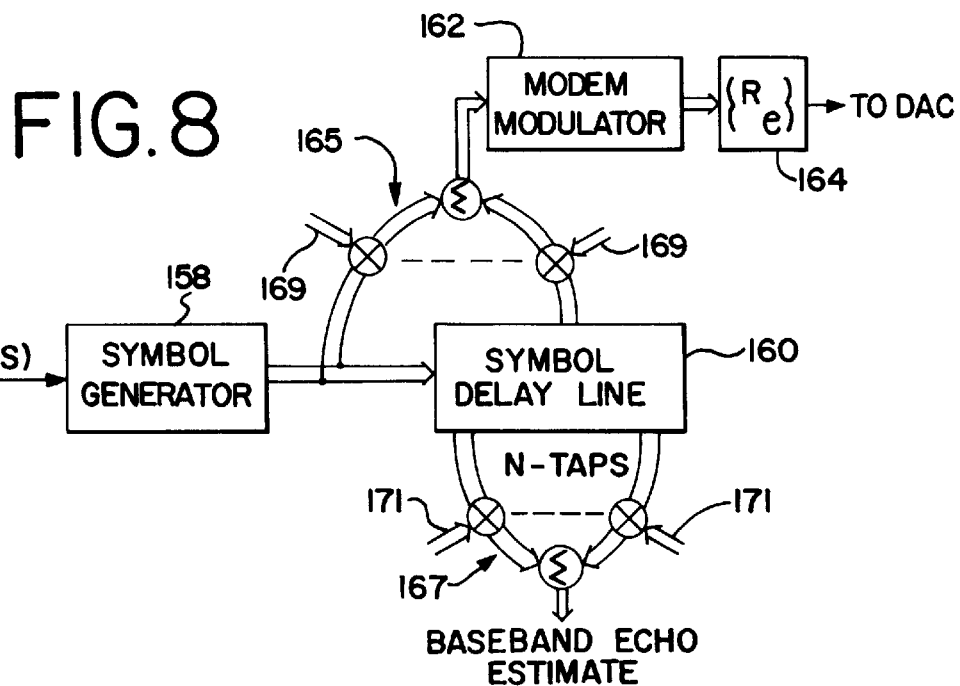
FIG. 8 depicts in more detail the modulator, seen at 150 in FIG. 7, and the near end echo canceler seen at 156 in FIG. 7.

For a more detailed explanation of the operation of the data pump 46, reference should be made to FIGS. 8, 9, and 10. FIG. 8 is a more detailed block diagram of the modulator 150 and the near end echo emulator 156 of the data pump 46. FIG. 9 is a more detailed diagram of the band limited phase splitter/demodulator 152 and FIG. 10 is a more detailed diagram of the baseband receiver/equalizer 154.

Referring first to FIG. 8, the modulator 150 and echo emulator 156 of data pump 46 include a symbol generator 158, symbol delay line 160, a modem modulator 162, and a filter element 164.

The design and operation of the high speed transmitter and echo emulator depicted in FIG. 8 is similar to that of the low speed transmitter and echo emulator described previously in connection with FIG. 5. The symbol generator 158 converts the user data at its input into complex transmit symbols. In the preferred embodiment, the symbol generator 158 operates at one-third the sample rate of the modem modulator 162. The output of the symbol generator 158 is then input to the symbol delay line 160. The symbol delay line 160 has a non-adaptive finite impulse response filter 165 and an adaptive finite impulse response filter 167. The non-adaptive filter 165 of the symbol delay line 160 filters and bandshapes the spectrum of the transmit signal in the baseband.

As part of the filtering procedure in the non-adaptive filter 165, the transmit signal is multiplied by transmit filter coefficients 169 that are stored in Read Only Memory. The output of the non-adaptive filter 165 is a filtered transmitter baseband signal that is generated at the sample rate of the digital-to-analog converter. In the preferred embodiment, this sample rate is three times higher than the symbol rate of the symbol generator 158. As with the filters 119 and 125 (FIG. 5), while the filters 165 and 167 of the preferred embodiment are finite impulse response filters, persons of skill in the art will appreciate that other means could be employed to accomplish the same result.

The output of the non-adaptive filter 165 of the symbol delay line 160 is input to the modem modulator 162.

Accordingly, the output of the modem modulator 162 is a passband transmitter signal centered at the actual transmit frequency. The filter element 164 then converts the complex transmitter signal into a real signal by eliminating the imaginary component. The output of the filter element 164 is then passed on to the digital-to-analog converter (FIG. 1) for transmission over the public telephone network.

The adaptive filter 167 is represented at the lower portion of the symbol delay line 160. The echo canceler coefficients 171 of the adaptive filter 167 are dynamic and are determined in such a manner as to minimize residual echo. During the filtering process, each of the symbols of the symbol delay line 160 is multiplied by an echo canceler coefficient 171. The coefficients 171 are learned during echo canceler training.

The primary difference between the symbol delay line 160 and the symbol delay line 116 (FIG. 5) is the rate at which they must compute the baseband echo estimate. The symbol delay line 116, like conventional echo cancelers in full duplex schemes such as V.32 and V.32 Bis, must compute the echo estimate at the sample rate of the analog-to-digital converter 28 (FIG. 1). In the preferred embodiment, this sample rate is 9600 samples per second. In contrast, the symbol delay line 160 need compute the echo estimate at only one-third the sample rate of the analog-to-digital converter. This is possible because the frequency band in which the echo must be cancelled is limited to the narrow frequency band of the low speed channel. Because the low speed receiver is not concerned with energy outside the frequency band of the low speed channel, echoes not falling within this narrow range can be ignored. Thus, the low speed receiver's echo canceler can operate at a much lower sample rate than conventional echo cancelers, thereby preserving precious computational resources in the DSP and minimizing the cost of the system.

Referring now to FIG. 9, the band limited phase splitter/demodulator 152 includes a d.c. block element 170, a first stage demodulator 172, a complex filter 174, a decimator 176, and a summing block 178. The d.c. block 170 is conventional and removes the d.c. offset in the received signal resulting from processing by the analog-to-digital converter 28. The output of the d.c. block 170 is then demodulated by a conventional first stage demodulator 172. The carrier frequency of the main channel transmitter is centered at 1920 hertz.

The output signal of the demodulator 172 is then input to a complex filter 174. The complex filter 174 of the preferred embodiment conserves resources by performing multiple functions. First, it passes only that energy within the frequency range of the low speed channel (now centered at −920 hertz), eliminating all energy outside of the bandwidth of this channel. In addition, it eliminates double frequency terms resulting from the demodulation process. Finally, it also serves as the anti-aliasing filter for the decimation process to follow. Those of ordinary skill in the art will appreciate that these functions could be performed by separate elements if desired.

The d.c. block 170, first stage demodulator 172, and the complex filter 174 of the preferred embodiment all operate at the sample rate of the analog-to-digital converter, though operation at other sample rates is contemplated. This sample rate of the received signal is reduced, however, by a conventional decimator 176. The decimation process can be performed without risk of aliasing because of the preceding anti-aliasing filter. In the preferred embodiment, the decimator 176 reduces the sample rate by a factor of three such that the sample rate of the output signal of the decimator 176 is the same as the sample rate of the baseband echo estimate computed by the baseband echo emulator 156. This reduced sample rate is still fast enough, however, to represent the narrow band received signal. Virtually all of the echo within the frequency band of the low speed receiver is then cancelled by subtracting the output of the decimator 176 from the baseband echo estimate at the summing block 178. As mentioned previously, because the present invention cancels only the echo in the frequency band of interest to the narrow band low speed receiver, the structure of the echo canceler is minimized.

The output signal of the summer block 178 consists of the intended receive signal plus any residual echo that was not cancelled. This signal moves on to a second stage of demodulation (FIG. 10) and also serves as an echo canceler error term 180 which can be used to update the baseband echo canceler coefficients.

Referring now to FIG. 10, the baseband receiver/equalizer 154 includes a second stage demodulator 184 (operating at 920 hertz in the preferred embodiment), an automatic gain control element 186, and a standard receiver 188. The initial demodulation of the low speed received signal by the bandlimited phase splitter/demodulator 152 (FIG. 9) is performed at the high speed channel's carrier frequency, which can result in a degree of "over-demodulation". The second stage demodulator 184 compensates for this and shifts the frequency spectrum of the received signal once again. The output of the demodulator 184 is then passed through the automatic gain control 186 and finally to a conventional receiver 188.

Modem Training

There are five different training schemes associated with the modem of the preferred embodiment. A general summary of the five training schemes will be provided and then each scheme will be discussed in greater detail.

The first scheme is Full Train. A Full Train is done either after an initial V.22 Bis ARQ connection is established, or after a line reversal (discussed below). Referring to FIG. 2 for illustration, a Full Train trains both receivers 50, 58 and the echo cancelers 52, 62 and also estimates round trip delay from the low speed transmitter 60 end for subsequent far end echo canceler training.

The second training scheme is Quick Retrain. This can be performed in various situations, including when either receiver 50, 58 has lost synchronization. The appropriate transmitter, 48 or 60, steps through a receiver retrain sequence and returns to data mode. Echo cancelers and the other receiver are not affected.

The third scheme is Full data pump Retrain. This procedure is invoked by either end after efforts to rebuild the link via protocol have failed. This procedure uses a very robust signaling method, followed by a normal Full Train procedure.

The fourth scheme is Full Turnaround. This is essentially a Full Train, but with the answer and originate ends reversed. The first time this procedure is invoked, a Full Train is performed. Subsequent Full Turnarounds are performed with a quicker method that takes advantage of stored echo canceler and receiver states.

The fifth and final scheme is Quick Turnaround. This procedure is a shortened version of the Full Turnaround that relies on stored echo canceler and receiver states. Each of these procedures will now be described in more detail.

Full Training

A V.22 Bis connection between the originating and answering modems is made with ARQ protocol enabled, and the modems step through the conventional handshaking procedures. During this handshaking, the availability of HST.bis mode at the originating and answering ends is established. HST.bis is the modulation technique utilized by the preferred embodiment. For this discussion, assume that the data pump 46 in FIG. 2 is at the answering end and that the data pump 56 is at the originating end. Also for this discussion, assume that the answering modem asks first, and the originator acknowledges HST.bis mode.

The answer mode sequence at the answering end (high speed transmit, low speed receive) will be described first. After it is determined that HST.bis is available, the answerer's supervisory microprocessor 44 commands the answering data pump 46 to begin normal HST.bis mode training sequence. The answering data pump then sends the following sequence to the originator's data pump 56:

| | |
|---|---|
| wink for 64Tf | signals the end of v.22bis |
| AB for 72Tf | initialize automatic gain control, timing loop, and arm the high speed receiver's detector |
| CD for 8Tf | timing marker for far end receiver training |
| TRN1 for N1Tf | train local echo canceler and far receiver |
| Transmitter squelch | quiets transmitter, allows for half duplex echo canceler training at the originate end. |

N1 is 1600 and Tf is the symbol time of the forward channel. The requirement is dominated by far end receiver training (discussed next). The goal is to train to a level sufficient to support a 16 point eye at 3200 baud, or 9600 bits per second, and continue to the next step.

After the high speed receiver 58 training sequence is completed, the answering data pump 46 now listens for the back channel 66 training sequence from the far end. This sequence is described below. The answering data pump 46 resumes transmitting after the back channel 66 training sequence is completed. The high speed transmitter 48 now sends the final training sequence:

| | |
|---|---|
| AB for 72Tf | initialize automatic gain control, timing loop, and arm ABCD detector |
| CD for 8Tf | timing marker for far end receiver training |
| TRN3 for N3Tf | touch up far end receiver training main channel Data mode |
| SCRB1 for 32Tf | Scrambled binary ones at 9600 bps. |

N3 is 192Tf. The receiver state from the first sequence is stored in the data pump's random access memory, so this training segment just touches up the receiver state. The answering data pump 46 then sends a "transmit data on" message to its supervisory microprocessor 44. The answer mode training is now complete.

Now the originate mode sequence at the originating end (high speed receiver, low speed transmitter) will be described. After handshaking, the originating supervisory microprocessor 54 puts the originating data pump 56 in the appropriate training mode by sending a message to the originating data pump 56 to begin normal HST.bis originate receiver training. First, the originate data pump 56 trains high speed receiver 58 according to the following sequence:

| | |
|---|---|
| AB for 20Tb | initialize automatic gain control, timing loop, and arm ABCD detector |
| CD for 4Tb | timing marker for far end receiver training |
| TRN2 for 60Tb | Train local echo canceler and far receiver |
| Back channel | |
| Data mode | |

Tb is the symbol time of the backward channel 66 (FIG. 2). The AB→CD signal returning from the answerer end will terminate the originator's round trip counter. The "transmit data" mode is then enabled on the originator end by the originator data pump 56 sending its supervisory microprocessor 54 a "connect" message and a "transmit data on" message.

After TRN2 is completed, the answerer sends its final training segment, as described in the Answer Mode section above. The high speed receiver 58 then touches up its state variables and the originator data pump 56 sends a "receive data on" message to its supervisory microprocessor 54, thus proceeding to the data mode.

Figure 11:
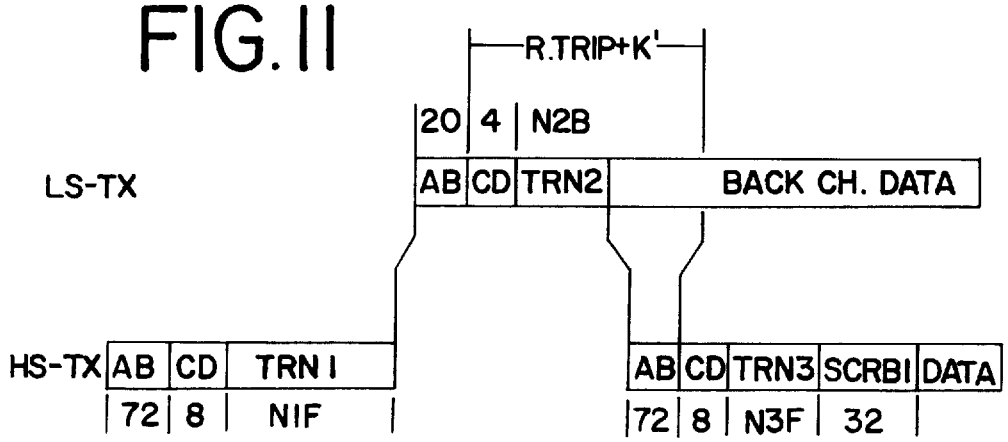
FIG. 11 is a chart which illustrates the Full Train procedure of the preferred embodiment.

The handshake is now complete. This procedure is depicted in FIG. 11.

Quick Retrain

Under this scheme, only the high speed receiver 58 is retrained. The low speed receiver 50 and the echo cancelers 52 and 62 are not retrained. This retrain is initiated by the high speed receiver's supervisory microprocessor 54. The signaling is done by protocol. The high speed receiver 58 is put in the train state, ready for the AB message. The high speed transmitter 48 receives a Quick Retrain command from its supervisory microprocessor 54, clamps data, steps through the following sequence, and returns to data mode at 9600 bps:

| | |
|---|---|
| AB for 72Tf | initialize automatic gain control, timing loop, arm ABCD detector |
| CD for 8Tf | timing marker for far end receiver training |
| TRN1 for N1Tf | train local far end receiver |
| Return to data mode (9600 bps) | |

Figure 12:
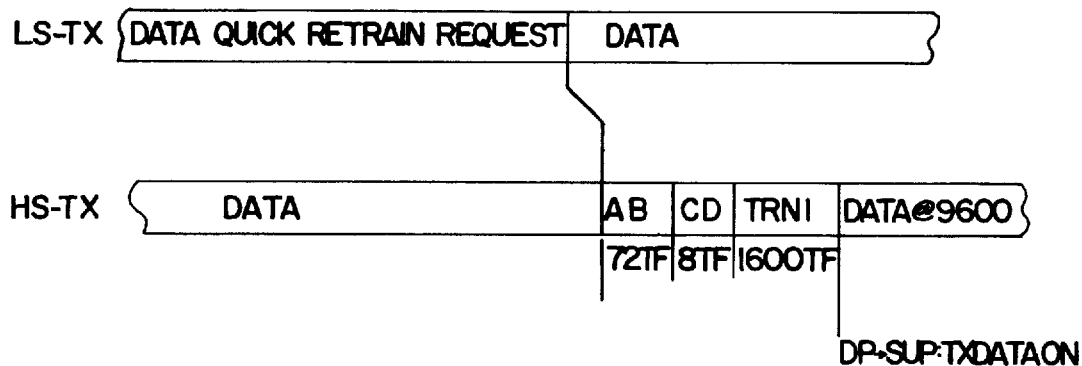
FIG. 12 is a chart which illustrates the Quick Receiver Retrain procedure of the preferred embodiment.

This procedure is depicted in FIG. 12.

Full Data Pump Retrain

This procedure is really two separate procedures, depending on whether the mode of the data pump is Originate or Answer. These labels refer to the current state of the link, i.e. answer mode=high speed transmit/low speed receive, originate mode=high speed receive/low speed transmit, rather than the initial connect state.

The former of the two procedures, Full Retrain of a data pump in the answer mode, is the least likely Full Retrain because it consists of a low speed receiver plus the near end echo canceler. The low speed receiver condition will not be monitored for mean square error, as it is for the high speed receiver. Instead, the supervisory microprocessor will determine the condition of the receiver from 2 considerations: data integrity and carrier status. If either is lost, the following retrain procedure is initiated:

the high speed transmitter sends AC and looks for the absence of a carrier on the backward channel. The AC signal can be detected by the low speed receiver even when the associated local echo canceler is not trained. Once the back channel is determined to be quiet, the high speed transmitter drops into AB, and follows the normal Full Train, discussed above the high speed receiver will collapse when AC is sent. Upon detection of AC, the low-speed transmitter is squelched. At the same time, the high-speed receiver looks for AB to start a full training sequence.

Figure 13:
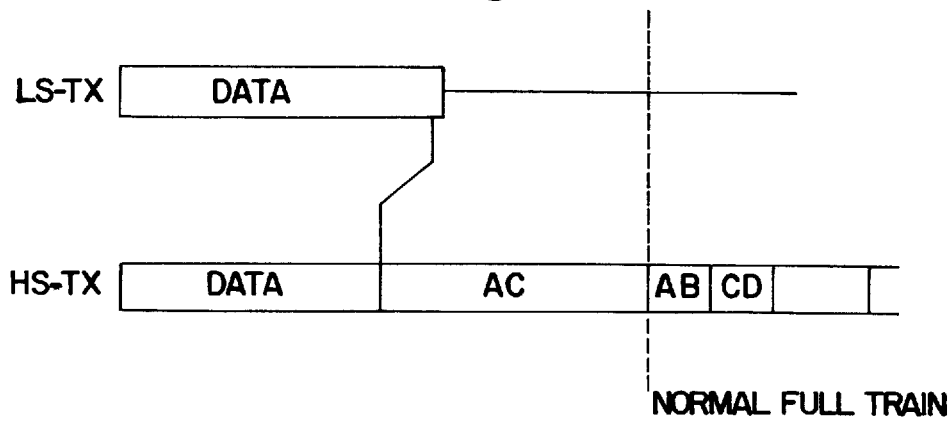
FIG. 13 is a chart which illustrates the Full Retrain procedure (answer mode) of the preferred embodiment.

The initial phase of this procedure is shown in FIG. 13. After this, the modems follow the procedure for Full Train from FIG. 11.

Figure 14:
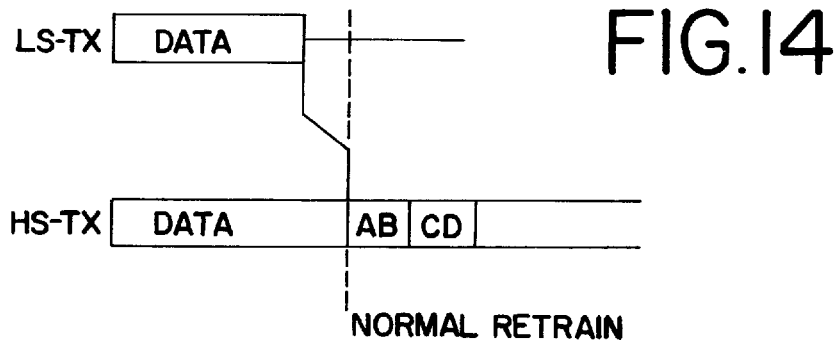
FIG. 14 is a chart which illustrates the Full Retrain procedure (originate mode) of the preferred embodiment.

The second of the two procedures, Full Retrain of a data pump in the originate mode, is the most common Full Retrain due to the fact that the high speed receiver is running as fast as the channel will allow. The high speed receiver's supervisory microprocessor determines that a retrain is necessary based on three criteria: carrier status, eye quality, and data integrity. A Quick Retrain is first attempted via protocol several times. If this is not successful, then the originate data pump follows this procedure:

the low speed transmitter is shut off, and the high speed receiver prepares for a retrain the low speed data will be lost, causing that end's supervisor to demand a retrain as just described in the first of these two procedures The initial phase of this second procedure is shown in FIG. 14. After this initial phase, the data pumps follow the procedure for a Full Retrain shown in FIG. 1.

Line Turn-Around (First Time)

The first time the asymmetric channel is turned around, the data pumps have to go through a full training procedure. This is essentially identical to the Full Train above, except it is entered from a high speed state, not V.22 Bis. Subsequent turnarounds use a shorter procedure, taking advantage of the stored states of echo cancelers and equalizers. For this discussion, assume that the first turn-around is done from the normal connect state, i.e. answerer is the high speed transmitter/low speed receiver, and the originator is the high speed receiver/low speed transmitter. The decision and signaling are done via protocol, and the modems enter the following sequence:

the high speed transmitter shuts off, and changes to a high speed receiver/low speed transmitter state, transmitting zero, receiver idle, waiting for AB the other end detects wink, switches modes, and starts the high speed transmit training sequence.

Figure 15:
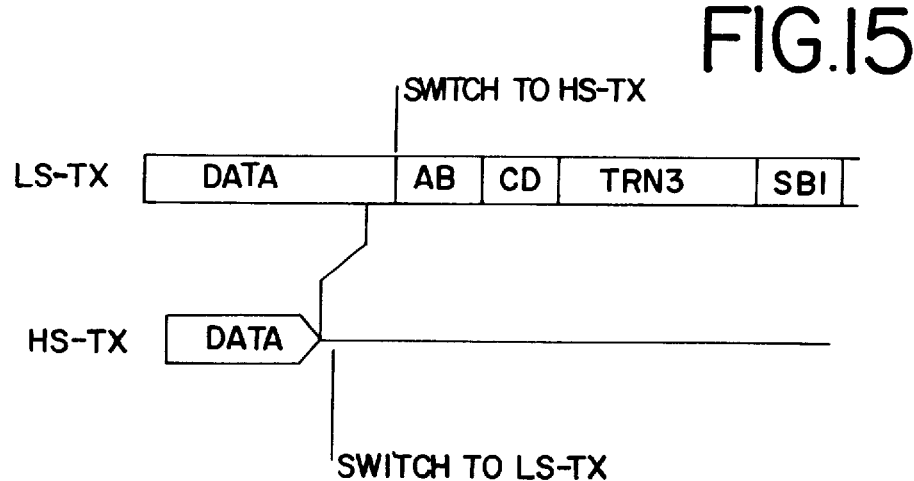
FIG. 15 is a chart which illustrates the Full Turnaround procedure of the preferred embodiment.

The initial part of this procedure is shown in FIG. 15. The remainder of this procedure is identical to the Full Train procedure depicted in FIG. 11.

Quick Turnaround

This procedure is also initiated via protocol. However, the stored states for the reverse direction are assumed valid. The procedure is initiated as follows:

at the high speed transmitter/low speed receiver end: the high speed transmitter winks off, converts to a low speed transmitter, clears its echo delay buffers, and transmits zero. The low speed receiver converts to the high speed receiver mode and looks for AB to start training.

at the high speed receiver/low speed transmitter end: this end "hears" the high speed transmitter wink, immediately shuts of the low speed transmitter, and converts to a high speed transmitter, sending the short training sequence (TRN3) from the Full Train. The low speed receiver listens for AB.

the current low speed transmitter sends the training sequence (TRN2) as soon as AB is detected by the forward channel.

Figure 16:
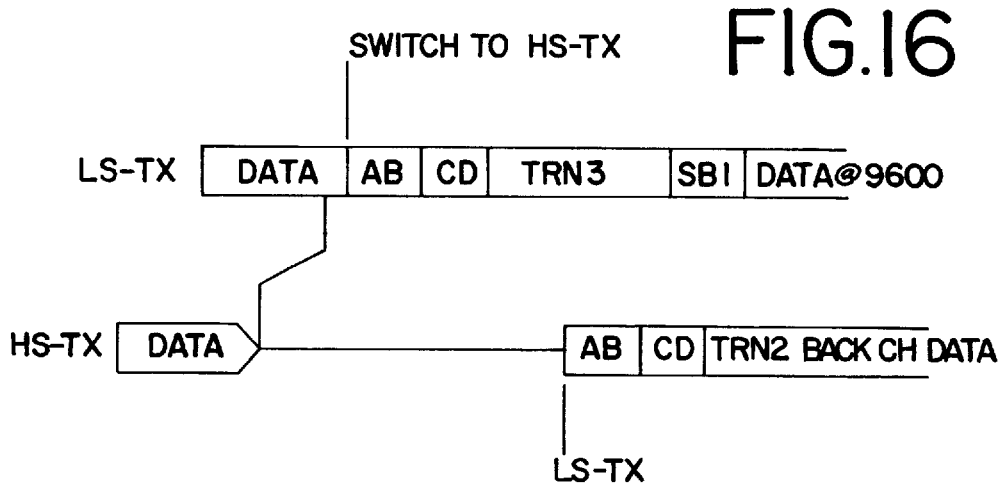
FIG. 16 is a chart which illustrates the Quick Turnaround procedure of the preferred embodiment.

This procedure is depicted in FIG. 16.

Although the foregoing description of the preferred embodiment will enable a person of ordinary skill in the art to make and use the invention, two detailed assembly language program listings are included below. The first program is entitled HSBCH.ASM. HSBCH.ASM is the HST.bis narrow band receiver, wide band receiver module and contains the echo cancelling routines associated therewith. The second program is entitled HSFCH.ASM. HSFCH.ASM is the HST.bis wideband receiver, narrowband transmitter module and contains the echo cancelling routines associated therewith. Additional detailed features of the system will become apparent to those skilled in the art from reviewing these programs.

Copyright © 1993 U.S. Robotics, Inc.

```
    ***************************
15  *                         *
    *   HSBCH.ASM             *
    *   HSTbis narrowband receiver *
    *        wideband transmitter  *
    *                         *
20  ***************************

.title   "HSTbis narrowband receiver, wideband transmitter module"
        .include "equ.asm"   (contains global declarations used by all the modules)
        .include "stat.asm"  (contains the status messages provided to the Supervisor from
                              the Data Pump)
25      .include "eqmac.asm" (contains macros for the equalizer)

*   Routines defined in this module
```

```
         *    .def    respd_retrn_hsfch
              .def    rxhsbch
              .def    txhsfch
              .def    carrier_tab
  5           .def    init_txhsfch
              .def    clear_hsfch_ectaps
         *    .def
         *    .def

*    Module references

10           .ref    biquad1,biquad2,biquad3,biquad4,biquad5,biquad6,biquad7
              .ref    bleed_jres
              .ref    bleed_taps
              .ref    calc_agc
              .ref    clrequ
 15           .ref    clrtap
              .ref    complex_agc
              .ref    cos_sin
         *    .ref    decod_48,decod_72,decod_96,decod_96unc,decod_120,decod_144
              .ref    descram_hst
 20           .ref    detect_hsab
              .ref    detect_mark
              .ref    dg4tab
              .ref    exit
              .ref    get_txd,get_data
 25           .ref    get_marks
              .ref    handshake
              .ref    hsbch_symtab
              .ref    initmf
              .ref    init_rx_seqnc
 30           .ref    integrate
              .ref    measure_timing
              .ref    queue_rxd
              .ref    queue_status
              .ref    recover_timing
 35           .ref    rx_seqnc
              .ref    scale
              .ref    sync
              .ref    sync_timing
              .ref    test_carrier
 40           .ref    trace
              .ref    update
              .ref    xsymtab
```

* Transmitter and echo canceler constants

```
bsflen .equ    bsfi-bsfr      ; band separation filter length
ref_48u   .equ   8
```

* Equalizer, carrier, baud loop constants

```
5    eqlen  .equ   12              ; equalizer length
     ti     .equ   tr+eqlen        ; imaginary taps
     xi     .equ   xr+eqlen        ; imaginary delay line ealfah .equ   6144            ; hot equalizer α
     ealfac .equ   2048            ; cold equalizer α

10   *calfah    .equ  24576        ; hot carrier loop α
     calfac .equ   12288           ; cold carrier loop α
     cbeta1     .equ  4096
     cbeta2     .equ  3072         ; 7.0 Hz lock limit, f = 75 Hz·cbeta2/32768
```

* Baud loop is left in high gain for fast recovery from timing hits.
15 * α must capture kf1·40·b_int2(max)/65536 = 1280
   * It will take longer than kf1·b_int2(max)/β1 = 4096T to learn b_int2

```
     balfah    .equ   2048         ; hot baud loop α
     bbetah    .equ   512          ; hot baud loop β1

20   *balfah   .equ   1536         ; hot baud loop α
     *bbetah   .equ   512          ; hot baud loop β1
     *balfac   .equ   384          ; cold baud loop α
     *bbetac   .equ   16           ; cold baud loop β1
     kf1       .equ   64           ; baud loop integrate/dump time
```

* Threshold constants

```
25   thresh_49    .equ  2ac7h   ; -49dBm AGC signal threshold
     thresh_ab    .equ  1000h   ; -49dbm AB detection threshold
     thresh_ampl  .equ  1536    ; amplitude threshold for 733/1267 Hz tone
     thresh_null  .equ  256     ; null threshold for above
```

```
*  ┌─────────────────────────────────────────────────────────┐
*  │              HSTbis RECEIVER SEQUENCE LIST              │
*  └─────────────────────────────────────────────────────────┘

*       structure: subroutine addr, T count (533.3 symbols/sec)

hsbch_seq                        ; HST backchannel sequence
*       .word  delay,64             ; delay 64T
*       .word  check_ec,16          ; check echo canceler convergence
   retry_seq                        ; retry energy detection
        .word  get_energy1,8        ; look for AB every 8T
        .word  get_energy2,16       ; confirm AB and sync baud timing
        .word  train,20             ; enable equalizer after 20T
        .word  eq_trn,100-5         ; reduce eq. loop gain after 1/3 sec
        .word  track,1600-100       ; place eq. in track mode after 3 sec
        .word  0

*  ┌─────────────────────────────────────────────────────────┐
*  │                 SUPERVISOR MODE FUNCTIONS               │
*  └─────────────────────────────────────────────────────────┘

*  ┌─────────────────────────────────────────────────────────┐
*  │              HSTbis FORWARD CHANNEL RETRAIN             │
*  └─────────────────────────────────────────────────────────┘ respd_retrn_hsfch                ; respond to retrain request
        rpt    #4
        pop apl    #o450bc|obump,sysflg ; preserve these flags
*       lacc   #rtrn_seq            ; initialize sequence parameters
        call   init_rx_seqnc ldp    #7
*       bd     rtrn_rxbch
        lacl   #0
        sacl   txmode init_retrain                     ; begin retrain
        rpt    #4                   ; discard stack contents resp_retrain                     ; respond to retrain
        pop                         ; discard return addr and proceed
```

39

```
       apl    #orxans|otxans|ousrmd,sysflg; preserve these flags
       opl    #oretrn|obump,sysflg      ; clamp rxdata and txdata lacl   #retraining               ; send retraining message to supv
       call   queue_status 5    ldp    #6
       dmov   kfe                       ; save previous round trip delay
       splk   #19200,timeout            ; timeout in 8 seconds

*  ┌────────────────────────────────────────────────────────────┐
  *  │         HSTbis BACKCHANNEL RECEIVER ENTRY POINT            │
 10 *  └────────────────────────────────────────────────────────────┘ rxhsbch
              call   init_txhsfch       ; *debug*
              call   clear_hsfch_ectaps
        *     splk   #trn_hsfch,txnseq 15           lacc   #hsbch_seq         ; initialize sequence parameters
              call   init_rx_seqnc ldp    #6                 ; page 6 variables:
              lacl   #0
              sacl   c_alpha            ; disable equalizer and carrier loop update
 20           sacl   c_beta1
              sacl   eq_alpha lacl   #2                 ; set number of received data bits
              sacl   rxnbit
              lacl   #3
 25           sacl   rxmask splk   #3198,timeout      ; set training timeout count, 5 sec

*  ┌────────────────────────────────────────────────────────────┐
  *  │           CHECK FOR ECHO CANCELER CONVERGENCE              │
  *  │           and DETECT ARRIVAL OF AB SEQUENCE                │
 30 *  └────────────────────────────────────────────────────────────┘

*    Converge local echo canceler.
  *    Detect carrier and AB, while also measuring baud timing phase.
```

40

```
        *   Both 0° (τ, τ/2) and 90° (3τ/4, τ/4) baud loop error signals are
        *   integrated. These are used to calculate the initial baud phase.

*   3dB attenuation at band edge causes signal power of AB to be
        *   3/4 of wideband signal power.

5           call    clear_ms            ; clear integrators, dp = 7 on exit splk    #4000h,agc_mant     ; set AGC for gain of 1/2
            splk    #0,agc_exp
            splk    #341*4/3,prescal    ; set AGC prescaler, 32768/(6·bc)

ldp     #0
10          splk    #xr,xda             ; setup display
            splk    #xi,yda
            lacl    #22
            sacl    xshft
            sacl    yshft 15          splk    $+2,rxrvec          ; reenter here ldp     #7
            splk    #6,nspb             ; collect six 3200 Hz samples per baud detect_energy_loop
            call    sync                ; wait for receiver sample
20          lacc    txvect              ; generate a sample to transmit
            cala
            bcnd    detect_energy_loop,ntc    ; decimate 3:1, 9600 Hz -> 3200 Hz call    complex_agc         ; measure energy level bldd    #rint_real+5,ab_re6 ; save demodulator output delayed 2T
25          bldd    #rint_imag+5,ab_im6 ; for AB detector call    demod_hsbch         ; demodulate sample to receiver baseband
            cc      detect_hsab,tc      ; detect AB (executes at 1600 Hz)

lacc    nspb                ; take in 6 samples per baud
            sub     #1
30          sacl    nspb
            bcnd    detect_energy_loop,neq lar     ar2,#xr             ; init equalizer input pointers
```

41

```
            lar     ar3,#xi
            call    measure_timing      ; measure baud timing phase intr    17                  ; display box lar     ar1,#timeout
 5          lacc    *                   ; decrement timeout count
            sub     #1
            sacl    *
            b       rx_seqnc

*       Routines which advance sequence

10  *       Complete nT of training then check convergence.

*       The AGC has been set to unity. The training sequence has been
    *       initiated and the received signal level is monitored. When the
    *       transmit echo is reduced to -xx dB of the expected receiver signal
    *       level, training is pushed ahead.

15  check_ec
            lacc    txtcnt              ; T count ≤ minimum + 128T?
            sub     #128
            bcnd    enable_rcvr,leq     ; yes, activate receiver lacc    agc_msh,16          ; calc (receiver signal level)·2^-13
20          adds    agc_msl
            bsar    9                   ; using 16x prescaler
            sub     agc_inth,16         ; is echo level below the 39 dB SNR threshold?
            subs    agc_intl
            bcnd    push_ahead,geq      ; yes, activate receiver 25          lamm    rxseqp              ; no, hold sequence
            sub     #2
            samm    rxseqp
    delay
            ret 30  push_ahead
            lacl    #16                 ; yes, push T count ahead
            sacl    txtcnt enable_rcvr
            pop                         ; discard return addr and proceed
```

42

```
              lacl    #1                  ; switch to low gain echo canceler train
              sacl    txecmo
              sach    echo_cnt            ; prevent any other mode switches lacl    #data_set_ready     ; tell supv to raise DSR
5             call    queue_status
              ret get_energy1                       ; loop waiting for signal
              lacc    agc_inth,16         ; signal present?
              adds    agc_intl
10            sub     #thresh_ab
              bcnd    try_again,leq       ; no, keep trying lacc    ab_inth,16          ; AB detected?
              bcnd    try_again,geq       ; no, keep trying b       clear_ms            ; yes, one more time 15      get_energy2                       ; loop waiting for AB
              lacc    agc_inth,16         ; signal present?
              adds    agc_intl
              sub     #thresh_ab,1        ; (integrated twice as long)
              bcnd    try_again,leq       ; no, keep trying 20            lacc    ab_inth,16          ; AB detected?
              bcnd    try_again,geq       ; no, keep trying lacc    #baud_sync          ; set reentry vector to continue
              samm    rxrvec
              ret 25      try_again
              lacc    #retry_seq          ; set sequence pointer to try again
              samm    rxseqp clear_ms
              ldp     #7
30            lacl    #0
              sach    agc_inth            ; zero AGC integrator
              sacl    agc_intl lar     ar1,#int_regs       ; zero baud sync integrators
              rpt     #7                  ; and AB sequence detector
```

43

```
               sacl    *+
               ret

*  ┌─────────────────────────────────────────────────────────────┐
    *  │            SYNCHRONIZE RECEIVER TIMING                       │
5   *  └─────────────────────────────────────────────────────────────┘

*     The baud timing parameter is calculated by examining the
    *     0° and 90° baud loop error signals.

baud_sync
               call    sync_timing         ; make the timing adjustment 10             splk    #balfah,b_alpha     ; hot baud loop gain
               splk    #bbetah,b_beta1 splk    #kf1,b_reload       ; init baud loop integrate/dump time
               dmov    b_reload
    *          splk    #7fffh,b_int2       ; *debug* - test baud loop capture range 15             lacl    #3                  ; enable AGC low pass filter, α = 1/8
               sacl    agc_alpha splk    #thresh_49,agc_thresh; set loss of carrier threshold
               splk    #144,agc_reload     ; set AGC sample count = 6·bc
               splk    #228,prescal        ; set AGC prescaler = 32768/agc_cnt
20             call    calc_agc            ; calculate the initial AGC level lacl    #0
               lar     ar1,#xr             ; zero equalizer delay line
               rpt     #eqlen*2-1
               sacl    *+

25             lar     ar1,#tr             ; clear equalizer taps
               rpt     #eqlen*2-1
               sacl    *+ lacc    #2000h              ; initialize equalizer center taps
               lar     ar1,#tr+4           ; (note: taps are backwards in memory)
30             sacl    *+
               sacl    *
```

44

```
        ldp     #6              ; page 6 variables:
        lacl    #0
        lar     ar1,#rint_real  ; zero interpolator input
        rpt     #11
        sacl    *+
```

```
*   ┌─────────────────────────────────────────────┐
*   │         HSTbis BACKCHANNEL RECEIVER LOOP    │
*   └─────────────────────────────────────────────┘
```

```
*       This loop runs at a 9600 Hz rate. It generates new samples to
*       transmit and places them in the I/O queue. It bandpass filters
*       the receiver samples and decimates them for the receiver.
*       The passband receiver signal is demodulated to a 1066.7 Hz
*       complex baseband signal. Baud rate processing runs at
*       533.3 Hz rate.

ldp     #0              ; page 0 variables:
        splk    #eq_outr,xda    ; set display address
        splk    #eq_outi,yda
        lacl    #24
        sacl    xshft
        sacl    yshft splk    #$+2,rxrvec     ; reenter here ldp     #7
        lacc    nspb,1          ; decimate by 6:1
        sacl    nspb            ; 3200 Hz -> 533 Hz (baud rate)

*       lacc    b_phase,16      ; *debug* - display timing phase
*       calld   cos_sin
*       lar     ar1,#3a0h main_sample_loop
        call    sync            ; wait for receiver sample
        lacc    txvect          ; generate a sample to transmit
        cala
        bcnd    main_sample_loop,ntc ; decimate 3:1, 9600 Hz -> 3200 Hz call    complex_agc     ; AGC the receiver sample
        cc      test_carrier,eq ; test carrier and update AGC level call    demod_hsbch     ; demodulate sample to receiver baseband
```

45

```
              lacc    nspb              ; take in N samples per baud
              sub     #1                ; N = 6 (± 2 to slip a sample)
              sacl    nspb
              bcnd    main_sample_loop,neq 5     *   Baud rate processing runs at the far end transmitter's baud
      *   rate when an adequate number of samples are available.

lar     ar2,#xr           ; init equalizer input pointers
              lar     ar3,#xi
              call    recover_timing    ; interpolate received samples to baud rate 10            call    detect_tone       ; detect 733/1267 Hz signaling tones ldp     #6                ; switch default data page
              call    equalize          ; equalize response, compensate carrier freq
              call    descram_v22       ; descramble received data
              call    queue_rxd         ; queue it
15            call    update_bch        ; update equalizer taps, carrier loop intr    17                ; display box lacc    baud_cnt          ; decrement the baud counter
              sub     #1
              sacl    baud_cnt          ; zero?
20            cc      sporadic,eq       ; yes, execute sporadic tasks
              b       rx_seqnc          ; sequence receiver state

*   Routines which advance sequence train
              splk    #ealfah,eq_alpha  ; enable equalizer tap update
25            splk    #calfac,c_alpha   ; cold carrier loop gain
              splk    #cbeta1,c_beta1 lacl    #1                ; enable window function for training
              sacl    bcwflg lacl    #120              ; init baud counter
30            sacl    baud_cnt arm_detect                      ; dummy routine to arm AB -> CD detector
              ret
```

46

```
         unclamp
               lacl    #0
               sacl    rxbindx           ; clear data buffer
               sacl    rxdbuf
 5             sach    eye_inth          ; zero eye_int
               sacl    eye_intl
               splk    #120,baud_cnt     ; allow sporadic tasks to run lar     ar1,#sysflg
               opl     #orxd,*           ; unclamp rxdata 10             lacl    #rx_data_on       ; indicate receive data on
               b       queue_status eq_trn
               lacl    #0                ; turn off equalizer update weighting
               sacl    bcwflg
15             ret track
               splk    #ealfac,eq_alpha  ; set final equalizer α
               ret

*       ╔══════════════════════════════════════════════════════════════╗
20   *  ║            HSTbis BACKCHANNEL DEMODULATOR                    ║
     *  ╚══════════════════════════════════════════════════════════════╝

*     Demodulate to baseband using approximate 1000 Hz carrier (at
     *     local crystal frequency) and generate complex signal components.

*     Complex signal has already been demodulated by 1920 Hz to forward
25   *     channel baseband.  Shift echo cancelled sample from transmitter
     *     baseband to receiver basebase and decimate by 2:1.

demod_hsbch
               lacc    rxcarr,15         ; update local oscillator VCO (φ)
               add     #18842,15         ; 920 Hz = 1920 Hz - 1000 Hz
30             sfl
               sach    rxcarr
               calld   cos_sin           ; lookup cos(φ), sin(φ)
               lar     ar1,#tempx+380h lt      rx_im             ; calculate imaginary sample
35             mpy     tempx
```

```
         ltp    rx_re
         mpy    tempy
         mpya   tempx          ; acc = cos(φ)·rx_im + sin(φ)·rx_re
         add    one,15         ; correct for truncation
 5       sacb
         ltp    rx_im          ; calculate real sample
         mpy    tempy
         spac                  ; acc = cos(φ)·rx_re - sin(φ)·rx_im
         add    one,15         ; correct for truncation
10       bit    nspb,b0        ; decimate 2:1
         bcnd   odd_sample,tc even_sample
         sach   rx_re0         ; save real sample
         exar
15       sach   rx_im0         ; save imaginary sample
         ret odd_sample
         lar    ar1,#rint_imag+4  ; advance receiver interpolator
         rpt    #9                ;   to accept new sample
20       dmov   *-
         dmov   * lar    ar0,#6
         add    rx_re0,16      ; average two real samples
         sach   *0+
25       exar                  ; average two imaginary samples
         add    rx_im0,16
         sach   *0-
         ret

*  ╔══════════════════════════════════════════════════╗
30 *  ║       DETECT 733/1267 Hz SIGNALING TONES         ║
*  ╚══════════════════════════════════════════════════╝

*   This detector looks for the following:
*      733 Hz turn-around initiate tone (266.7 Hz cw in baseband)
*      1267 Hz retrain request tone (266.7 Hz ccw in baseband)
35 *   It is a differential detector which examines the tones as they
*   enter the equalizer for 90° rotation at a τ/2 rate.

*   for 733 Hz, xr0 = xi1 = -xr2  and  xi0 = -xr1 = -xi2
```

```
*       (xr0 - xi1)² + (xi0 + xr1)² + (xi1 + xr2)² + (xr1 - xi2)² = null
*       for 1267 Hz, xr0 = -xi1 = -xr2 and xi0 = xr1 = -xi2
*       (xi0 - xr1)² + (xr0 + xi1)² + (xr1 + xi2)² + (xi1 - xr2)² = null detect_tone
 5          lacc    bc1267cnt           ; advance 1267 Hz detection count
            add     #1
            sacl    bc1267cnt lacc    bc733cnt            ; advance 733 Hz detection count
            add     #1
10          sacl    bc733cnt setc    ovm                 ; prevent acc overflow
            lar     ar1,#xr             ; detect 733 Hz null and 1267 Hz amplitude
            lar     ar2,#xi+1
            call    detect              ; below null threshold?
15          xc      2,geq
            splk    #0,bc733cnt         ; no, zero count
            lacb
            sub     #thresh_ampl,15     ; above amplitude threshold?
            xc      2,lt
20          splk    #0,bc1267cnt        ; no, zero count lar     ar1,#xi             ; detect 1267 Hz null and 733 Hz amplitude
            lar     ar2,#xr+1           ; reverse roles of real and imag eq samples
            call    detect              ; below null threshold?
            xc      2,geq
25          splk    #0,bc1267cnt        ; no, zero count
            lacb
            sub     #thresh_ampl,15     ; above amplitude threshold?
            xc      2,lt
            splk    #0,bc733cnt         ; no, zero count
30          clrc    ovm                 ; restore overflow mode lacc    bc733cnt
            sub     #20
            ccd     queue_status,eq     ; report 733 Hz tone detected
            lacc    #detected_300

35          lacc    bc1267cnt
            sub     #20
            ccd     queue_status,eq     ; report 1267 Hz tone detected
```

49

```
            lacc    #detected_450
            ret

*       Subroutine to detect presence of 733 or 1267 Hz detect                          ; mnemonics are for 733 Hz detector
5           lacc    *+,15,2             ; swap real and imaginary for 1267 Hz detector
            sub     *-,15               ; xr0 - xi1
            sach    tempw lacc    *+,15,1
            add     *+,15               ; xi0 + xr1
10          sach    tempx lacc    *-,15,2
            add     *+,15               ; xr2 + xi1
            sach    tempy lacc    *+,15,1
15          sub     *,15,1              ; xr1 - xi2
            sach    tempz zap                         ; accumulate square error
            sqra    tempw
            sqra    tempx
20          sqra    tempy
            sqra    tempz
            apac
            sacb
            sub     #thresh_null,15     ; test null threshold
25          ret
```

* | EQUALIZE RECEIVER FREQUENCY RESPONSE and DECODE DATA |

* Highspeed backchannel receiver equalizer is a 12 tap complex
30 * FIR filter using 1067 Hz samples at a 533 Hz baud rate.

```
        equalize
            equal   12,2                ; generate equalizer output
```

* Rotate received point to decision axis

50

```
              rotate  0            ; no jitter tracker

*    Decode received point for HST backchannel

*    Allow quadrants to determine the signal point decision.

*            Im
 5  *             |
    *        *    |    *
    *    B = 10   |  A = 00
    *    ─────────┼─────────Re
    *             |
10  *        *    |    *
    *    C = 11   |  D = 01 lacc    eq_outr,16
             sacb
             lacc    eq_outi,16
15           rolb                      ; make quadrant decision
             rol
             sacl    tempx             ; save decoded bits, tempx = Y2'Y1' lar     ar1,#dpts         ; get signal point for equalizer update
             bit     tempx,b1
20           lacc    #9159             ; radius = 4096·/10
             xc      1,tc
             neg
             sacl    *+                ; return point in (decr0,deci0)

bit     tempx,b0
25           lacc    #9159             ; radius = 4096·/10
             xc      1,tc
             neg
             sacl    *-

*    Differential and gray decoder for 4-phase data 30           lacl    #3                ; get last decoded state
             and     dstate
             add     tempx,2           ; include new state, acc = Y2'Y1'Y2 Y1
             add     #dg4tab           ; index into differential decode table
             tblr    rxdata            ; rxdata = Q2 Q1
35           lacc    tempx             ; update decoded state for next time
```

```
                sacl    dstate          ; dstate = Y2'Y1'

*       Generate error vector and integrate eye scatter generr
                inteye 5       *       Counter rotate error vector for tap update

*       The counter rotated error signal, scaled by the loop gain (eq_alpha)
        *       is used to modify each of the equalizer taps proportional to the
        *       associated received point (unrotated).

crotate

10      *       Calculate carrier loop phase error
        *       Radius weighting is constant for phase-only modulation of backchannel.

cerror ret

*
15      *  ||         V.22bis and HST BACKCHANNEL DESCRAMBLER           ||
        *

*       On entry and exit, data is in (rxdata), dp = 6 descram_v22
                lacc    rxdata,1        ; include data in descrambler
20              or      descrh
                sacl    descrh
                lacc    descrl
                bsar    3               ; form X^-14
                xor     descrl          ; acc = X^-14.xor.X^-17
25              xor     rxdata          ; acc = data.xor.X^-14.xor.X^-17
                and     rxmask          ; isolate descrambled bits
                sacl    rxdata
                lacc    descrh,16       ; shift descrambler right
                adds    descrl
30              lt      rxnbit
                satl
                retd
                sach    descrh          ; save descrambler data
```

```
                    sacl   descrl

*  ╔══════════════════════════════════════════════════════╗
          *  ║     UPDATE CARRIER LOOP PHASE and EQUALIZER TAPS     ║
          *  ╚══════════════════════════════════════════════════════╝

5        *    The counter rotated error signal, scaled by the loop gain (eq_alpha)
          *    is used to modify each of the equalizer taps proportional to the
          *    associated received point (unrotated).

*    errp + j·errq  =  eqα·{cos(φ) - j·sin(φ)}·(errr + j·erri)
          *    (tr,ti) is the equalizer tap, (xr,xi) is the received point 10        *    φ(n)  =  φ(n - T) - cα·cerr(n) + cβ2·θ(n - T)
          *    θ(n)  =  θ(n - T) - cβ1·cerr(n)  limited to ±7 Hz update_bch
                   cloop   0                         ; update carrier loop, no jitter tracker lar     ar1,#tr                   ; last tap <-> latest point
15                 lar     ar2,#ti
                   lar     ar3,#xr+eqlen+1           ; points have already been shifted
                   lar     ar4,#xi+eqlen+1 lacc    #trn_window               ; get window function for training
                   samm    bmar 20                 lacc    eq_errp                   ; copy equalizer error to temp regs
                   sacl    tempx
                   lacc    eq_errq
                   sacl    tempy bit     bcwflg,b0                 ; window function enabled?

25                 lacl    #eqlen-1                  ; update imaginary equalizer taps
                   samm    brcr
                   rptb    updtap-1 bcnd    updreal,ntc               ; no, skip spm     0
30                 mads    eq_errp                   ; scale error with window function
```

```
            spl     tempx
            mads    eq_errq
            spl     tempy
            lamm    bmar                ; advance to next value in window
5           add     #1
            samm    bmar
            spm     1                   ; restore product mode

*       tr = tr - errp·xr - errq·xi
        *       ti = ti - errq·xr + errp·xi 10      updreal
            zalr    *                   ; get real tap + rounding
            sub     *,1,3               ; bleed tap
            lt      *,4
            mpy     tempx               ; P reg = errp·xr
15          lts     *-,1
            mpy     tempy               ; P reg = errq·xi
            spac
            sach    *+,0,2              ; update real tap zalr    *                   ; get imaginary tap + rounding
20          sub     *,1,3               ; bleed tap
            mpy     tempx               ; P reg = errp·xi
            lta     *-,2
            mpy     tempy               ; P reg = errq·xr
            spac
25          sach    *+,0,1              ; update imaginary tap
        updtap
            ret trn_window                      ; window function for training
            .word   0,1,2,3,4,4,3,2,1,0,0,0
```

30  EXECUTE SPORADIC TASKS

```
        sporadic                        ; dp = 6, acc = 0
            splk    #120,baud_cnt       ; reload baud counter 35          dmov    eye_inth            ; update eye scatter mean square
```

```
           dmov   eye_intl
           lacl   #0
           sach   eye_inth            ; zero error integrator
           sacl   eye_intl
 5         ret
```

```
*  ┌─────────────────────────────────────────────────────────────────┐
*  ║       TRANSMIT AND ECHO CANCELER INITIALIZATION                 ║
*  └─────────────────────────────────────────────────────────────────┘ init_txhsfch
10         lar    ar1,#bsfr           ; zero complex band separation filter
           rptz   #bsflen*2-1
           sacl   *+ lar    ar1,#fc_an          ; zero tx/ec symbol delays
           rpt    #(fcaicdly+fcnelen)*2-1
15         sacl   *+ ldp    #7                  ; initialize page 7 variables:
           sacl   txtcnt              ; zero T interval count, (to accept a command)
           sacl   txindx              ; init tap index
           sacl   tx_z                ; zero transmit preemphasis memory
20         sacl   echo_cnt            ; hold off echo canceler
           sacl   ne_alpha            ; freeze echo canceler taps splk   #10,txcarr          ; init carrier phase splk   #txhsfch,txvect     ; init transmit sample vector bd     tx_seqnc            ; generate first symbol
25         splk   #txzero_hsfch,txnseq clear_hsfch_ectaps               ; clear forward channel echo canceler taps
           lar    ar1,#fcner_hi       ; zero ec high taps
           rptz   #fcnelen*2-1
           sacl   *+

30         lar    ar1,#fcner_lo       ; zero ec low taps
           rpt    #fcnelen*2-1
           sacl   *+
           ret
```

```
                ┌─────────────────────────────────────────────────────────┐
    *           │                                                         │
    *           │     FOWARD CHANNEL TRANSMITTER AND ECHO CANCELER        │
    *           └─────────────────────────────────────────────────────────┘

*     This routine runs once per sample time.
 5        *     The next symbol is generated every third sample.

txhsfch
                  lacc    txcarr
                  sub     #2                  ; update carrier VCO
                  sacl    txcarr
10                xc      2,eq
                  splk    #10,txcarr
                  add     #carrier_tab        ; offset to cosine/sine table
                  lar     ar1,#txcos
                  rpt     #1
15                tblr    *+                  ; read carrier phase components

*     Filter transmit symbols and modulate with carrier frequency
          *     txout = RE{[Σ(an·ck) + j·Σ(bn·ck)]·[cos(φ) + j·sin(φ)]}
          *           = cos(φ)·Σ(an·ck) - sin(φ)·Σ(bn·ck)

lacc    #fchtx_coef         ; index into transmit baseband coefficients
20                add     txindx
                  samm    bmar lar     ar1,#fc_an          ; point to real symbol delay
                  zap
                  rpt     #19                 ; calc real output
25                mads    *+
                  mpya    zero                ; zero P reg & accumulate product
                  add     one,8               ; correct for truncation
                  sach    tempx,7             ; acc = Σ(an·ck)

adrk    #fc_bn-(fc_an+20)   ; point to imaginary symbol delay
30                lacc    one,8               ; correct for truncation
                  rpt     #19                 ; calc imaginary output
                  mads    *+
                  lta     tempx
                  sach    tempy,7             ; acc = Σ(bn·ck)

35                mpy     txcos               ; cos(φ)·Σ(an·ck)
                  ltp     tempy
                  mpy     txsin               ; sin(φ)·Σ(bn·ck)
```

```
            spac                    ; acc = cos(φ)·Σ(an·ck) - sin(φ)·Σ(bn·ck)
            sach   txout,1          ; save transmitter output

*   Transmitter preemphasis filter boosts high frequencies about 4dB
    *   compensating for rolloff in the telephone network.

5           zalr   txout            ; negative for preemphasis
            sub    tx_z,14          ; b1 coeff = -3/8
            sub    tx_z,13
            calld  scale            ; add transmit sample to I/O queue
            sach   tx_z
10          sach   txout

*   Generate complex receiver sample in transmitter baseband lt     blok_z10         ; get dc blocked receiver sample
            mpy    txcos            ; xr = cos(φ)·blok_z00
            lacc   one,14           ; correct for truncation
15          mpya   txsin            ; xi = -sin(φ)·blok_z00
            lar    ar1,#bsfr
            sach   *,1              ; save baseband signal at filter input
            lacc   one,14           ; correct for truncation
            spac
20          adrk   #bsflen          ; ar1 -> bsfi
            sach   *,1

*   Complex band separation filter

*   Perform imaginary calculation first, shift delay line
    *   rx_im = Σ(xi·cr + xr·ci)

25          spm    0                ; reduce gain for rxbsf
            lar    ar1,#bsfi+bsflen-1
            zap
            rpt    #bsflen*2-1
            macd   bsf_coefr,*-     ; shift samples
30          apac
            bsar   2
            add    one,15           ; correct for truncation
            sach   rx_im            ; save imaginary output
            spm    1                ; restore product mode 35  *   Check if transmit symbol needs to be updated - decimate 3:1
```

```
              clrc    tc                      ; reset decimation flag lacc    txindx                  ; update tap index
              add     #20
              sacl    txindx
 5            sub     #60                     ; new symbol required?
              retc    lt                      ; no, exit forward channel transmitter splk    #0,txindx               ; reload tap index

*       Continue with real calculation on every third sample
      *       rx_re = Σ(xr·cr - xi·ci)

10            spm     0                       ; reduce gain for rxbsf
              lar     ar1,#bsfi+bsflen        ; (delay line has been shifted)
              zap
              rpt     #bsflen-1
              mac     bsf_coefi,*-            ; taps are reversed in memory
15            mpya    zero                    ; zero P reg & accumulate product
              neg
              rpt     #bsflen-1
              mac     bsf_coefr,*-
              apac
20            bsar    2
              add     one,15                  ; correct for truncation
              sach    rx_re                   ; save real output spm     2                       ; gain of 2^3 for convolutions

*       Estimate near end echo
25    *       ne_re + j·ne_im = Σ[(an + j·bn)·(ner + j·nei)]
      *                       = Σ(an·ner) - Σ(bn·nei) + j·[Σ(an·nei) + Σ(bn·ner)]

*       Cancel near end echo by adding estimate to baseband sample.
      *       Compensate for a 10h unit transmitter point with a gain of 2^8 lar     ar1,#fc_bn+fcaicdly+fcnelen-1
30            zap
              rpt     #fcnelen-1
              mac     fcnei_hi+1800h,*-
              apac
              neg                             ; acc = - Σ(bn·nei)
35            sbrk    #fcaicdly
              rpt     #fcnelen-1
```

58

```
          mac    fcner_hi+1800h,*-
          apac                        ; acc = Σ(an·ner) - Σ(bn·nei)
          add    one,10               ; correct for truncation
          add    rx_re,11
5         sach   rx_re,5              ; save receiver sample / echo error adrk   #fcaicdly+fcnelen*2
          zap
          rpt    #fcnelen-1
          macd   fcner_hi+1800h,*-

10        rpt    #fcaicdly-1
          dmov   *-                   ; move transmit symbols rpt    #fcnelen-1
          macd   fcnei_hi+1800h,*-
          apac                        ; acc = Σ(an·nei) + Σ(bn·ner)
15        add    one,10               ; correct for truncation
          add    rx_im,11
          sach   rx_im,5              ; save receiver sample / echo error rpt    #fcaicdly-1
          dmov   *-                   ; move transmit symbols 20        spm    1                    ; restore product mode
```

```
*┌─────────────────────────────────────────────────┐
*│         FOWARD CHANNEL ECHO CANCELER TAP UPDATE │
*└─────────────────────────────────────────────────┘
```

*   Update all near end taps, ne_alpha controls rate of convergence.

```
25        lar    ar1,#fcner_hi                    ; ar1,ar2 = real tap
          lar    ar2,#fcner_lo
          lar    ar3,#fcnei_hi                    ; ar3,ar4 = imaginary tap
          lar    ar4,#fcnei_lo
          lar    ar5,#fc_an+fcaicdly+fcnelen      ; ar5 = real symbol
30        lar    ar6,#fc_bn+fcaicdly+fcnelen      ; ar6 = imaginary symbol

*         ner(n) = ner(n) - α·errr·a(n) - α·erri·b(n)
*         nei(n) = nei(n) + α·errr·b(n) - α·erri·a(n)

lt     ne_alpha                         ; scale error by α
          lacc   one,12                           ; correct for truncation
```

```
        mpy     rx_re
        mpya    rx_im              ; acc = α·errr, P reg = α·erri
        sach    tempx,3            ; tempx = α·errr
        ltp     tempx
5       add     one,12
        sach    tempy,3            ; tempy = α·erri lacl    #fcnelen-1         ; update near end taps
        samm    brcr
        spm     2                  ; increase gain by 2^3 during near end train 10      mar     *,5
        mpy     *,1                ; mult α·errp·an
        rptb    nedp-1 lacc    *,16,2             ; load real tap
        adds    *,6
15      lts     tempy              ; acc = tap - α·errp·an
        mpy     *,5                ; mult α·errq·bn
        mpys    *-,1               ; mult α·errq·an
        sach    *+,0,2             ; acc = tap - α·errp·an - α·errq·bn
        sacl    *+,0,3             ; store real tap 20      lacc    *,16,4             ; load imaginary tap
        adds    *,6
        lts     tempx              ; acc = tap - α·errq·an
        mpy     *-,5               ; mult α·errp·bn
        mpya    *,3                ; mult α·errp·an
25      sach    *+,0,4             ; acc = tap - α·errq·an + α·errp·bn
        sacl    *+,0,1             ; store imaginary tap
nedp
        spm     1                  ; restore product mode
```

---

30      SYMBOL RATE TRANSMIT SEQUENCER

---

\*    A new sequence is executed when the symbol interval T count has
\*    decremented to zero.

```
        tx_seqnc
35          lacl    #0ffh          ; default data is marks
            sacl    txdata
```

60

```
               lacl    txtcnt                         ; T count zero?
               bcnd    reenter,neq                    ; no, reenter command in progress lacl    txnseq                         ; new sequence ready?
               bcnd    reenter,eq                     ; no, reenter command in progress 5       *      Begin execution of a sequence
        *      Save the parameter, init T count, and branch to the subroutine sach    txnseq                         ; indicate new sequence accepted
               lar     ar1,#txrvec
               rpt     #2
10             tblr    *+                             ; get subroutine addr, parameter, T count
               add     #3
               sacl    txseqp                         ; save pointer to next element reenter
               lacc    txrvec                         ; branch to the subroutine
15             bacc

*      Sequence lists
        *      structure: subroutine addr, immediate parameter or pointer, T count txzero_hsfch                                  ; transmit zero using forward channel
               .word   txzero,0,1
20             .word   0 trn_hsfch                                     ; HSTbis training sequence 1
               .word   txzero,0,24                    ; ≥16T of zero
               .word   spatt,0202h,72                 ; 72T of AB
               .word   spatt,3131h,8                  ; 8T of CD
25             .word   quadtrn,2,fcaicdly+fcnelen     ; TRN for 8192T
               .word   echotrn,0,8192-(fcaicdly+fcnelen) ; enable ne tap updates
               .word   mark,0,128                     ; B1
               .word   0 trn3                                          ; HSTbis training sequence 3
30             .word   spatt,0202h,256                ; S
               .word   spatt,3131h,16                 ; S*
               .word   quadtrn,2,1024                 ; TRN for 1280T
               .word   rpatt,sr3,8                    ; R3 - runs until next cmd received
               .word   0

35      comp144                                       ; complete seq at 14.4 Kbps coded
```

61

```
           .word  epatt,0f199h,8          ; E
           .word  0

*  ┌─────────────────────────────────────────────────────────┐
*  │ HSTbis FORWARD CHANNEL TRANSMITTER SYMBOL GENERATOR     │
*  └─────────────────────────────────────────────────────────┘

*       The reentry vector (txrvec) controls program flow, arp = 1

*       Transmit a zero txzero
           bd     cmdx
           lacl   #0                      ; zero transmit data
           sacl   txdata

*       Transmit an alternating pattern, AC, CA, AA, CC, AB, CD patt
           lacl   #2                      ; transmit two symbols
           sacl   txtcnt
           b      pattcom spatnt                                 ; transmit N = Kfe + 64 symbols of S
           lar    ar1,#kfe                ; get Kfe
           lacl   *
           add    #65                     ; +1 for rounding
           and    #0fffeh                 ; set T count = even (Kfe + 64)
           sacl   txtcnt
           b      pattcom                 ; exit via common pattern spatnfe                                ; far end transmitter is off
           lar    ar1,#kfe
           lacl   *                       ; modify Kfe by Koff to align returned
           sub    #fcaicdly+fcnelen       ;   echo within far end echo canceler
           bcnd   nlimit,gt               ; limit far end delay to avoid overlap
           lacl   #0                      ;   with near end taps
   nlimit
           add    #fcaicdly+fcnelen       ; fcaicdly+fcnelen ≤ txfedly ≤ max delay
           sacl   txfedly

*       Transmit alternating pattern or 1200 Hz tone, DCBA pattcom
```

```
            splk    #$+2,txrvec         ; reenter here spatt                               ; transmit an S pattern
            lacc    txtcnt,2            ; get two lsb's of T count
            sub     #4
            samm    treg1               ; T reg = 12,8,4,0,...
            lacc    txparm
            satl
            and     #0fh
            bd      cmdx
            add     #ref_48u            ; add symbol code offset
            sacl    txdata              ; save transmit data

*   Transmit four-phase scrambled marks echotrn
            bd      quadx
            splk    #100h,ne_alpha      ; enable near end echo canceler quadtrn                             ; quadphase TRN sequence
            lacl    #2
            call    set_nbit            ; set number of scrambler bits
            splk    #01110 11b,scramh   ; init scrambler for ACCBDDCBBD...
            splk    #1011101110011111b,scraml quadx
            splk    #$+2,txrvec         ; reenter here call    scram_hst           ; scramble marks
            lacc    txdata              ; skip diff encoding during TRN sequence,
            sacl    estate              ;   but save the encoder state
            bd      cmdx
            add     #ref_48u            ; add quadphase symbol code offset
            sacl    txdata              ; save symbol
                                        ; exit command

*   Send rate sequence (R1, R2, or R3)

rpatt                               ; send rate sequence
            lar     ar1,txparm          ; (ar1) = sr1, sr2, sr3, sr4
            lacc    *                   ; get rate sequence from sr1, sr2, sr3, sr4
            sacl    txpatt              ; save pattern
            lacl    #6                  ; save patt16 primitive as mode command and
            sacl    txmode              ;   inhibit reexecution of training sequence
```

```
            b       pat16com

*       Send end sequence (E)

epatt
            lacc    txpatt          ; get V.32bis bits from rate sequence
5           and     #880h
            or      txparm          ; include end sequence
            sacl    txpatt
            b       pat16com

*       Transmit 16 bit pattern at 4800 bps 10  patt16                          ; 16 bit pattern primitive
            lacl    #8              ; transmit eight dibits
            sacl    txtcnt pat16com                        ; common 16-bit pattern entry point
            lacl    #2
15          call    set_nbit        ; set number of scrambler bits
            splk    #$+2,txrvec     ; reenter here lacl    txtcnt          ; complete any 8-symbol sequence
            nop
            xc      2,eq            ; T count = zero?
20          splk    #8,txtcnt       ; yes, set it to 8 lacl    txpatt          ; align dibit
            sfl
            sfl
            sach    tempz
25          or      tempz
            sacl    txpatt          ; save rotated data
            sfr                     ; reverse 2 lsb's for shift right scrambler
            and     one
            add     txpatt,1
30          sacl    txdata          ; save data to transmit call    scram_hst       ; scramble data
            call    grayenc         ; gray and differential encode
            bd      cmdx
            add     #ref_48u        ; add symbol code offset
35          sacl    txdata          ; save encoded data
                                    ; exit command
```

64

```
*       Transmit marks at speed until data arrives (B1)

mark                            ; transmit marks at selected rate
                splk    #txdunc,txrvec  ; *debug*
                lacc    #2
 5              call    set_nbit        ; set number of scrambler bits lacl    #5
                sacl    txmark          ; abort any incomplete rate switch
                sach    txbindx         ; clear data buffer
                sach    txdbuf
10              splk    #get_data,txd_vect ; set transmit data source lar     ar1,#sysflg     ; unclamp txdata
                opl     #otxd,*         ; (actually controlled by T count)

lacc    estate,3        ; init trellis encoder
                sacl    estate
15              lacc    txrvec
                bacc                    ; branch to one the following:

*       Transmit data txdunc                          ; transmit uncoded data
                lacc    txtcnt
20      *       cc      get_txd,eq      ; unclamp data after B1 period
                call    scram_hst       ; scramble data
                call    grayenc         ; gray and differential encode
                bd      check_rate
                add     #ref_48u        ; add symbol code offset
25              sacl    txdata          ; save encoded data txdcod                          ; transmit coded data
                lacc    txtcnt
        *       cc      get_txd,eq      ; unclamp data after B1 period
                call    scram_hst       ; scramble data
30      *       call    trellenc        ; differential trellis encode lt      txnbit          ; add symbol code offset
                addt    one
                addt    one
                sacl    txdata          ; save encoded data 35      check_rate
```

65

```
*       lacc    txmark              ; 36T of mark transmitted?
*       sub     #36
*       cc      switch_rate,eq      ; yes, perform ASL rate switch
                                    ; exit via cmdx
```

```
╔════════════════════════════════════════════════════╗
║              COMMON COMMAND EXIT                   ║
╚════════════════════════════════════════════════════╝
```

```
cmdx
*       lacc    echo_cnt            ; training count zero?
*       bcnd    quesym,eq           ; yes, skip
*       sub     #1                  ; no, decrement count
*       sacl    echo_cnt
*       cc      ecseq,eq            ; sequence the echo canceler

*       Transmit symbol table lookup

*       On exit, near end (fc_an0, fc_bn0) complex transmit symbol has
*       been updated, and loop gains have been adjusted.

lar     ar1,#fc_an          ; ar1 = destination addr
        lar     ar0,#fc_bn-fc_an    ; ar0 = pointer offset
        lacc    txdata              ; acc = transmit symbol code
        add     #xsymtab            ; add symbol table base addr
        tblr    tempx               ; lookup fc_an0, fc_bn0
        lacc    tempx,8             ; sign extend high byte - fc_an0
        sacl    tempz               ; (save low byte)
        xor     tempz
        sach    *0+,1               ; adjust to a 10h unit transmit point
        lacc    tempz,8             ; sign extend low byte - fc_bn0
        sach    *0-,1

*       Decrement the symbol interval T count and if greater than zero
*       exit, else continue execution of a sequence in progress,
*       else zero T count so that a new command may be interpreted.

setc    tc                  ; set decimation flag lacl    txtcnt              ; decrement T count
        sub     #1                  ; > zero?
        sacl    txtcnt
        retc    gt                  ; yes, exit txec
```

66

```
        lacl    txseqp
        sach    txtcnt          ; zero T count
        tblr    tempx           ; get subroutine addr
        sacb
5       lacc    tempx           ; zero?
        retc    eq              ; yes, end of sequence, exit txec sacl    txrvec          ; no, save as reentry vector
        lacb
        add     #1
10      tblr    txparm          ; get parameter
        add     #1
        tblr    txtcnt          ; get T count
        retd                    ; exit txec
        add     #1
15      sacl    txseqp          ; save pointer to next element
```

```
*  ┌─────────────────────────────────────────────────┐
*  │          HSTbis TRANSMITTER SUBROUTINES         │
*  └─────────────────────────────────────────────────┘
```

```
*       Perform HSTbis rate switch
20  *   36T of marks have been transmitted at the old rate.
    *   Set up the transmitter sequencer to transmit another 36T of
    *   marks at the new rate.

switch_rate
        splk    #mark,txrvec    ; transmit 36T additional marks
25      lacc    txpatt          ; get txmode from txpatt register
        sacl    txparm
        splk    #36+1,txtcnt    ; (T count decrements on exit from tx/ec)
        ret
```

```
*       Gray and differential encoder, (txdata) = input
30  *   on exit, acc = encoded output

*   Least significant two bits of data are gray encoded then
    *   differentially encoded using a combination lookup table.

grayenc
        lacc    txdata,2        ; acc = Q4 Q3 Q2 Q1 0 0
35      or      estate          ; or in last state, Y2 Y1
        and     #0fh            ; acc = Q2 Q1 Y2 Y1
        add     #dg4tab         ; index into table
```

67

```
              tblr    estate          ; (estate) = Y2'Y1'(new)
              lacl    #0ch            ; restore high data
              retd
              and     txdata
 5            or      estate          ; acc = Q4 Q3 Y2'Y1'

*   Set number of scrambler bits and transmit data mask
     *   On entry, acc = # bits per symbol set_nbit
              sacl    txnbit          ; set number of bits
10            lt      txnbit          ; form transmit data mask
              lact    one
              retd
              sub     #1
              sacl    txmask          ; exit set_nbit 15   *  ┌─────────────────────────────────────────────────────────────┐
     *  │                    HSTbis SCRAMBLER                         │
     *  └─────────────────────────────────────────────────────────────┘

*   HSTbis forward channel scrambler (V.32 originate mode)
     *   On entry, data is in (txdata), dp = 7

20       scram_hst
              lacc    scraml          ; form X^-18
              bsar    5
              xor     scraml          ; acc = X^-18.xor.X^-23
              xor     txdata          ; acc = data.xor.X^-18.xor.X^-23
25            and     txmask          ; isolate scrambled bits
              sacl    txdata
              lacc    txdata,7
              or      scramh
              sacl    scramh
30            lacc    scramh,16       ; shift scrambler right
              adds    scraml
              lt      txnbit
              satl
              retd
35            sach    scramh          ; save scrambler data
              sacl    scraml          ; exit scram_hst
```

| FILTER COEFFICIENTS |
|---|

```
            assign  .macro      k0,k1,k2,k3,k4
5                   .asg    0,y
                    .loop   5
                    .eval   k:y:,kc:x:
                    .eval   x+1,x
                    .eval   y+1,y
10                  .endloop
                    .endm

*     Forward channel transmit baseband filter, 60 taps
      *     fs = 9600 Hz, β = 5.5, fc = 1650 Hz, gain = 3

.mnolist
15                  .asg    0,x
                    assign  7,-14,-35,-16,43
                    assign  82,26,-100,-158,-30
                    assign  199,270,17,-362,-427
                    assign  29,618,642,-137,-1026
20                  assign  -946,365,1729,1437,-881
                    assign  -3253,-2575,2631,10357,16082 fchtx_coef
                    .word   kc0,kc3,kc6,kc9,kc12,kc15,kc18,kc21,kc24,kc27
                    .word   kc29,kc26,kc23,kc20,kc17,kc14,kc11,kc8,kc5,kc2
25                  .word   kc1,kc4,kc7,kc10,kc13,kc16,kc19,kc22,kc25,kc28
                    .word   kc28,kc25,kc22,kc19,kc16,kc13,kc10,kc7,kc4,kc1
                    .word   kc2,kc5,kc8,kc11,kc14,kc17,kc20,kc23,kc26,kc29
                    .word   kc27,kc24,kc21,kc18,kc15,kc12,kc9,kc6,kc3,kc0

*     Backchannel receiver band separation filter, 49 taps
30    *     fs = 9600 Hz, β = 8.0, fc = 300 Hz, gain = 8
      *     δ = 2π(1000Hz - 1920Hz)/9600Hz .asg    0,x
                    assign  1,-4,-20,-43,-53          ; cos(nδ) modulated
                    assign  -33,13,41,0,-108
35                  assign  -168,16,583,1419,2066
                    assign  1873,389,-2203,-4935,-6382
```

69

```
              assign -5396,-1659,3047,7285,8955 bsf_coefr
              .word  kc0,kc1,kc2,kc3,kc4,kc5,kc6
              .word  kc7,kc8,kc9,kc10,kc11,kc12,kc13
              .word  kc14,kc15,kc16,kc17,kc18,kc19,kc20
              .word  kc21,kc22,kc23,kc24,kc23,kc22,kc21
              .word  kc20,kc19,kc18,kc17,kc16,kc15,kc14
              .word  kc13,kc12,kc11,kc10,kc9,kc8,kc7
              .word  kc6,kc5,kc4,kc3,kc2,kc1,kc0

.asg   0,x
       assign 4,12,16,3,-31              ; sin(nδ) modulated
       assign -69,-79,-43,0,-45
       assign -259,-596,-802,-503,554
       assign 2192,3699,4058,2515,-840
       assign -4859,-7745,-7938,-5007,0 bsf_coefi
              .word  kc0,kc1,kc2,kc3,kc4,kc5,kc6
              .word  kc7,kc8,kc9,kc10,kc11,kc12,kc13
              .word  kc14,kc15,kc16,kc17,kc18,kc19,kc20
              .word  kc21,kc22,kc23,0,-1*kc23,-1*kc22,-1*kc21
              .word  -1*kc20,-1*kc19,-1*kc18,-1*kc17,-1*kc16,-1*kc15,-1*kc14
              .word  -1*kc13,-1*kc12,-1*kc11,-1*kc10,-1*kc9,-1*kc8,-1*kc7
              .word  -1*kc6,-1*kc5,-1*kc4,-1*kc3,-1*kc2,-1*kc1,-1*kc0

*      Carrier table:
*      cosine/sine components for the forward channel carrier angles carrier_tab
              .word  14598,-7438     ; 333°
              .word  -2563,-16182    ; 261°
              .word  -16182,-2563    ; 189°
              .word  -7438,14598     ; 117°
              .word  11585,11585     ; 45°

.end
```

```
        *************  *************
        *                           *
        *    HSFCH.ASM              *
        *    HSTbis wideband receiver  *
5       *         narrowband transmitter  *
        *                           *
        *****************************

.title   "HSTbis wideband receiver, narrowband transmitter module"
                .include "equ.asm"
10              .include "stat.asm"

.def    hsbch_symtab
                .def    rxhsfch
                .def    txhsbch
                .def    init_txhsbch
15              .def    clear_hsbch_ectaps
        *       .def
        *       .def .def    init_retrn_hst
                .def    hsbch_symtab
20              .def    turn_around

*    Module references

.ref    base_72,base_96,base_120,base_144
                .ref    biquad1,biquad2,biquad3,biquad4,biquad5,biquad6,biquad7
                .ref    bleed_jres
25              .ref    bleed_taps
                .ref    calc_agc
                .ref    carrier_tab
                .ref    clrequ
                .ref    clrtap
30              .ref    complex_agc
                .ref    cos_sin
                .ref    decod_48,decod_72,decod_96,decod_96unc,decod_120,decod_144
                .ref    fast_hilbert
                .ref    detect_hsab
35              .ref    detect_mark
                .ref    descram_hst
                .ref    dg4tab
                .ref    equalize
                .ref    eye_test
```

71

```
            .ref    exit
            .ref    get_marks
            .ref    handshake
            .ref    initmf
 5          .ref    init_bband
            .ref    init_rx_seqnc
            .ref    init_vbuf
            .ref    integrate
            .ref    measure_timing
10          .ref    queue_rxd
            .ref    queue_status
            .ref    recover_timing
            .ref    rx_seqnc
            .ref    scale
15          .ref    sync
            .ref    sync_timing
            .ref    test_carrier
            .ref    trace
            .ref    trnhst
20          .ref    update
            .ref    divide32
            .ref    get_txd,get_data
            .ref    xsymtab
            .ref    get_txd,get_data
25          .ref    queue_status

*       Transmitter and echo canceler constants koff    .equ    20          ; offset to align returned echo within far end delay
    beta2   .equ    7           ; PRL lock limit, ß2 = 2^(n-16), 7200/2·ß2 = 7.031 Hz
    ref_48u .equ    8           ; offset to four-phase symbol table 30  *       Equalizer, carrier, baud loop constants eqlen   .equ    60          ; equalizer length
    ti      .equ    tr+eqlen    ; imaginary taps
    xi      .equ    xr+eqlen    ; imaginary delay line ealfaft .equ    4096        ; equalizer α during forced training
35  ealfah  .equ    2048        ; hot equalizer α
    ealfac  .equ    768         ; cold equalizer α calfah  .equ    3200        ; hot carrier loop α
    calfac  .equ    3200        ; cold carrier loop α
```

72

```
        cbetac      .equ   2048    ; cold carrier loop β1 jalfah .equ 1024            ; hot jitter tracker loop α
        jalfac .equ 512             ; cold jitter tracker loop α balfah      .equ   1536    ; hot baud loop α
5       bbetah      .equ   512     ; hot baud loop β1
        balfac .equ 384             ; cold baud loop α
        bbetac      .equ   16      ; cold baud loop β1 kf1    .equ  64             ; cold baud loop integrate/dump time

*    Threshold constants 10      thresh_tone .equ   24384   ; -46 dBm AGC update threshold for rev detect
        thresh_ab   .equ   4096    ; -49 dBm AB threshold
        thresh_47   .equ   1024    ; -47 dBm carrier present threshold

*****************************************
   *   The following routines are initiated by the supervisor.       *
15 *****************************************

*  ┌─────────────────────────────────────────────┐
        *  ║           SUPERVISOR RETRAIN FUNCTIONS              ║
        *  └─────────────────────────────────────────────┘ init_retrain_hsfch          ; begin retrain
20           rpt    #4              ; discard stack contents resp_retrain_hsfch          ; respond to retrain
               pop                  ; discard return addr and proceed apl    #orxans|otxans,sysflg   ; preserve these flags
               opl    #oretrn|obump,sysflg    ; clamp rxdata and txdata 25             lacl   #retraining              ; send retraining message to supv
               call   queue_status ldp    #6
               dmov   kfe           ; save previous round trip delay
               splk   #19200,timeout ; timeout in 8 seconds 30             lar    ar1,#sysflg
               bit    *,frxans      ; answer mode?
```

```
                ┌─────────────────────────────────────────────────────────────┐
              * │                  SUPERVISOR MODE FUNCTIONS                  │
              * └─────────────────────────────────────────────────────────────┘

*   Respond to request for turn-around

5            *                    ┌─ supervisor's command received (switch_rxbch)
              *   ──────────────────────────────────────────────────────────────
              *    backward data  | AB  |CD|   TRN1      | B1 |  forward data
              *   ──────────────────────────────────────────────────────────────
              *                        data pump's action
10            *                   |───────────────────────────────────────────>
              *
              *                       ┌─ supervisor's command received (turn_around)
              *                          wink
              *    forward data    |──────────────|   TRN2     | backward data
15            *   ──────────────────────────────────────────────────────────────
              *                    <- 75msec ->       data pump's action
              *                   |───────────────────────────────────────> - turn_around
                        ldp    #7
20                      splk   #6,txmode    ; line reversal sequence
                        ret

*   Request a retrain for the HST receiver

*                       ┌─ supervisor's command received (init_retrn_hst)
              *   ──────────────────────────────────────────────────────────────
25            *    backward data   |  retrain tone   |   TRN2    | backward data
              *   ──────────────────────────────────────────────────────────────
              *                    <── 100msec ──>     data pump's action
              *                   |───────────────────────────────────────────> init_retrn_hst
30                      ldp    #7
                        splk   #7,txmode              ; HST retrain request sequence
                        ret

*   Rate switch commands from the supervisor swrx_hsfch                          ; switch receiver after detecting 8 marks
35                      lamm   exparm                 ; get rate parameter
                        sub    #5
```

74

```
            retc    geq                     ; must be in range - +
            add     #5
            ldp     #6
            sacl    swrx_rate
 5          lacl    #8                      ; init marks count
            sacl    marks_cnt
            lacc    #swrx_seq
            b       init_rx_seqnc swtx_hsfch                            ; switch transmitter after sending 36 marks
10          lamm    exparm                  ; get rate parameter
            sub     #5
            retc    geq                     ; must be in range 0-4
            add     #13+5                   ; 13 - 4800 bps uncoded data
            ldp     #7
15          sacl    txpatt                  ; (txpatt is used as temp reg for txmode)
            splk    #get_marks,txd_vect     ; begin transmitting 36T of marks
            ret
```

```
*  ╔══════════════════════════════════════════════════════════════╗
*  ║   HSTbis FORWARD CHANNEL RECEIVER SEQUENCE LISTS             ║
*  ╚══════════════════════════════════════════════════════════════╝

*       HSTbis receiver micro-sequencer
*       structure: subroutine addr, T count hsfch_seq
       retry_seq                            ; retry energy detection
            .word   get_energy1,16          ; look for AB every 16T
            .word   get_energy2,32          ; confirm AB and sync baud timing
            .word   arm_detect,8            ; arm reversal detector 64T later
            .word   detect_abcd,1           ; detect reversal
            .word   force_trn,19            ; adjust primary tap position in eq.
            .word   baud_trn,192            ; turn down equalizer gain after 192T
            .word   end_force,1280-256      ; end forced training after 1280T
            .word   eq_trn,4800-1280        ; reduce baud loop gain after 2 sec.
            .word   track,7200-4800         ; place eq. in track mode after 3 sec.
            .word   0 swrx_seq
  *         .word   detect_mark,1           ; detect 8 consecutive marks
  *         .word   init_vbuf,30            ; init viterbi decod after 38T of mark
  *         .word   track,8                 ; enable equalizer update after 8T
  *         .word   restore,8               ; unclamp rxdata 8T later
```

```
*       .word   0

*   ┌─────────────────────────────────────────────────────────┐
*   │         CHECK FOR ECHO CANCELER CONVERGENCE             │
*   └─────────────────────────────────────────────────────────┘

5   *   The AGC has been frozen on previously received signal level,
    *   either TRN1 (originate mode) or AA (answer mode). A training
    *   sequence has been initiated and the received signal level is
    *   monitored. When the transmit echo is reduced to -39 dB of the
    *   expected receiver signal level, training is pushed ahead.
10  *   This level is 3 dB below the nominal noise level injected on
    *   the far end transmitter signal by the phone network.

*   This loop is kept reasonably efficient in run time since the
    *   echo canceler is working hardest at this time.

.if     0
15  check_ec
            pop                         ; discard return addr and proceed
            ldp     #0
            splk    #rint_real,xda      ; setup display
            splk    #rint_imag,yda
20          lacl    #23
            sacl    xshft
            sacl    yshft splk    #check_tcnt,rvec    ; set main sequence reentry vector ldp     #7
25          splk    #1365,prescal       ; AGC prescaler = 16·32768/(128·3)

ec_conv
            lacl    #0
            sach    agc_inth            ; zero AGC integrator
            sacl    agc_intl
30          splk    #384,agc_cnt        ; check ec convergence every 128T ec_conv_loop
            call    sync                ; wait for receiver sample
            lacc    txvect              ; generate a sample to transmit
            cala 35          call    complex_agc         ; AGC the receiver sample, level is frozen
```

76

```
           call    demod_hsfch        ; demodulate the sample for the display intr    17                 ; display box ldp     #6
           lacc    timeout,16         ; decr timeout count
  5        adds    timefrac
           sub     #21845             ; subtract 1/3
           sach    timeout
           sacl    timefrac ldp     #7
 10        lacc    agc_cnt            ; 128T elapsed?
           bcnd    ec_conv_loop,neq   ; no, loop call    handshake          ; yes, check main sequence
           b       ec_conv

*          Complete at least 1024T of training. 7936T - 1024T = 6912T
 15 *      (256T of biphase training precedes the 1024T minimum)

check_tcnt
           ldp     #7
           lacc    txtcnt
           sub     #6000              ; 6000 ≤ T count ≤ 7040?
 20        retc    lt
           sub     #1040
           retc    gt                 ; no, loop call    exit               ; yes, continue when T count ≤ 7040
                                      ; after 128T it will be ≤ 6912

25 *      Check for end of training and protect against pushing a rate seq ahead.

lar     ar1,#kfe
           lacc    #1800              ; calc minimum T count for PRL to learn freq
           subs    *                  ; 0.75 sec - Kfe
           sacb
 30        lacl    #16                ; set minimum of 16T
           crgt lacc    txtcnt             ; T count ≤ minimum + 128T?
           sub     #128
           sbb
```

77

```
                bcnd    enable_rcvr,leq    ; yes, activate receiver lacc    agc_msh,16         ; calc (receiver signal level)·2^-13
                adds    agc_msl
                bsar    9                  ; using 16x prescaler
5               sub     agc_inth,16        ; is echo level below the 39 dB SNR threshold?
                subs    agc_intl
                retc    lt                 ; no, loop lacb                       ; yes, push T count ahead
                sacl    txtcnt 10      enable_rcvr
                pop                        ; discard return addr and proceed
                lacl    #1                 ; switch to low gain echo canceler train
                sacl    txecmo
                sach    echo_cnt           ; prevent any other mode switches 15              lacc    txtcnt             ; should see response after T count + Kfe
                adds    *
                ldp     #6
                add     #1200              ; plus 0.5 sec for timeout
                sacl    timeout 20              lacl    #data_set_ready    ; tell supv to raise DSR
                call    queue_status
                .endif
```

```
*
*        |  DETECT ARRIVAL OF AB SEQUENCE                                 |
25      *
```

```
        *       This path executes once in answer mode to train the receiver to
        *       detect R2 and continue on, and twice in originate mode, first
        *       to detect R1 and then once more as a final train (R3).

*       The timeout and dlycnt constants have been set by the previous
30      *       routine with the expected delay in the return of S pattern (AB).

*       3dB attenuation at band edge causes power of AB to be 3/4 of
        *       wideband signal level.

rxhsfch
                call    init_txhsbch       ; *debug*
```

```
                call    clear_hsbch_ectaps
        *       splk    #trn_hsbch,txnseq lacc    #hsfch_seq              ; initialize sequence parameters
                call    init_rx_seqnc 5       *       Detect carrier energy and S (AB). This loop runs at a 7200Hz rate.
        *       Both 0° (τ, τ/2) and 90° (3τ/4, τ/4) baud loop error signals are
        *       generated which are used to calculate initial baud phase.

call    clear_ms                ; clear integrators, dp = 7 on exit
                sacl    rx_z                    ; zero preemphasis filter
10              lar     ar1,#ps_fast            ; clear Hilbert phase splitter
                rpt     #49
                sacl    *+
                splk    #10,rxcarr              ; init demodulator phase splk    #3000h,agc_mant         ; set AGC for gain of 3/8
15              splk    #0,agc_exp
                splk    #341*4/3,prescal        ; set AGC prescaler, 32768/(3·bc)

ldp     #0
                splk    #xr,xda                 ; setup display
                splk    #xi,yda
20              lacl    #22
                sacl    xshft
                sacl    yshft splk    $+2,rxrvec              ; reenter here ldp     #7
25              lar     ar1,#2                  ; set 3 samples per baud detect_energy_loop
                sar     ar1,nspb
                call    sync                    ; wait for receiver sample
                lacc    txvect                  ; generate a sample to transmit
30              cala call    complex_agc             ; AGC the receiver sample bldd    #rint_real+5,ab_re6     ; save demodulator output delayed 2T
                bldd    #rint_imag+5,ab_im6     ; for AB detector
```

79

```
             call    demod_nsfch        ; translate sample to baseband
             call    detect_hsab        ; detect AB lar     ar1,nspb           ; collect 3 samples per baud
             banz    detect_energy_loop,*-

5            lar     ar2,#xr            ; init equalizer input pointers
             lar     ar3,#xi
             call    measure_timing     ; measure baud timing phase intr    17                 ; display box lar     ar1,#timeout
10           lacc    *                  ; decrement timeout count
             sub     #1
             sacl    *
             b       rx_seqnc           ; sequence receiver state

*    Routines which advance sequence

15  *    Complete nT of training then check convergence.

*    The AGC has been set to unity. The training sequence has been
    *    initiated and the received signal level is monitored. When the
    *    transmit echo is reduced to -xx dB of the expected receiver signal
    *    level, training is pushed ahead.

20  check_tcnt
             lacc    txtcnt             ; T count ≤ minimum + 128T?
             sub     #128
             bcnd    enable_rcvr,le     ; yes, activate receiver lacc    agc_msh,16         ; calc (receiver signal level)·2^-13
25           adds    agc_msl
             bsar    9                  ; using 16x prescaler
             sub     agc_inth,16        ; is echo level below the 39 dB SNR threshold?
             subs    agc_intl
             bcnd    push_ahead,geq     ; yes, activate receiver 30           lamm    rxseqp             ; no, hold sequence
             sub     #2
             samm    rxseqp
    delay
             ret
```

```
         push_ahead
              lacl    #16                   ; yes, push T count ahead
              sacl    txtcnt enable_rcvr
  5           pop                           ; discard return addr and proceed
              lacl    #1                    ; switch to low gain echo canceler train
              sacl    txecmo
              sach    echo_cnt              ; prevent any other mode switches lacl    #data_set_ready       ; tell supv to raise DSR
 10           call    queue_status
              ret get_energy1                        ; loop waiting for signal
              lacc    agc_inth,16           ; signal present?
              adds    agc_intl
 15           sub     #thresh_ab
              bcnd    try_again,leq         ; no, keep trying lacc    ab_inth,16            ; AB detected?
              bcnd    try_again,geq         ; no, keep trying b       clear_ms              ; yes, one more time 20      get_energy2                        ; loop waiting for AB
              lacc    agc_inth,16           ; signal present?
              adds    agc_intl
              sub     #thresh_ab,1          ; (integrated twice as long)
              bcnd    try_again,leq         ; no, keep trying 25           lacc    ab_inth,16            ; AB detected?
              bcnd    try_again,geq         ; no, keep trying lacc    #baud_sync            ; set reentry vector to continue
              samm    rxrvec
              ret 30      try_again
              lacc    #retry_seq            ; set sequence pointer to try again
              samm    rxseqp clear_ms
              ldp     #7
```

81

```
            lacl    #0
            sach    agc_inth        ; zero AGC integrator
            sacl    agc_intl lar     ar1,#int_regs   ; zero baud sync integrators
5           rpt     #7              ; and AB sequence detector
            sacl    *+
            ret
```

```
*  ┌─────────────────────────────────────────────────────────┐
*  │         SYNCHRONIZE RECEIVER BAUD TIMING                │
10 *  └─────────────────────────────────────────────────────────┘

*       The baud timing parameter is calculated by examining the
*       0° and 90° baud loop error signals.

baud_sync
            call    sync_timing     ; make the timing adjustment 15          splk    #balfah,b_alpha ; hot baud loop gain
            splk    #bbetah,b_beta1 splk    #kf1,b_reload   ; init baud loop integrate/dump time
            dmov    b_reload

*           splk    #1,updb_reload  ; always update baud timing parameter
20 *        dmov    updb_reload     ; (install to save run time)
```

```
*  ┌─────────────────────────────────────────────────────────┐
*  │         INITIALIZE HSTbis RECEIVER VARIABLES            │
*  └─────────────────────────────────────────────────────────┘ init_va
25          ldp     #6                      ; page 6 variables:
            splk    #0111011b,vscrmh        ; init scrambler for forced training
            splk    #1011101110011111b,vscrml
            call    init_bband              ; common HST and V.32 code call    initmf                  ; initialize matched filter
30          call    clrequ                  ; zero equalizer delay line lacc    timeout                 ; set false S detect count
            sub     #256                    ; (if AB -> CD is not detected in 256T,
            sacl    blank_cnt               ;   S was probably detected from an echo)
```

82

```
              ldp     #7              ; page 7 variables:
              call    calc_agc        ; calculate initial AGC level, reloads agc_cnt lacl    #0
              sacl    agc_cnt         ; prevent AGC update by setting agc_cnt = 0
 5            samm    rvec            ; suspend main sequence temporarily
```

```
*  ╔═══════════════════════════════════════════════════════════════╗
*  ║                    MAIN RECEIVER LOOP                         ║
*  ╚═══════════════════════════════════════════════════════════════╝
```

```
    *         This loop runs at a 9600Hz rate.  The passband receiver input is
10  *         echo cancelled and demodulated to a complex baseband signal.

ldp     #0
              splk    #eq_outr,xda
              splk    #eq_outi,yda    ; setup display
              lacl    #24
15            sacl    xshft
              sacl    yshft splk    #$+2,rxrvec     ; reenter here

*       ldp     #7
      *       lacc    b_phase,16      ; *debug* - display timing phase
20    *       calld   cos_sin
      *       lar     ar1,#3a0h sample_loop
              call    sync            ; wait for receiver sample
              lacc    txvect          ; generate a sample to transmit
25            cala call    complex_agc     ; AGC the receiver sample
              call    detect_wink     ; check for wink before AGC update
              lacc    agc_cnt
              cc      test_carrier,eq ; test carrier and update AGC level 30            call    demod_hsfch     ; translate sample to baseband lacc    nspb            ; collect N samples per baud
              sub     #1
              sacl    nspb
              bcnd    sample_loop,neq
```

83

```
*       Baud rate processing runs at the far end transmitter's baud
*       rate when an adequate number of samples have been collected.

lar    ar2,#xr           ; init equalizer input pointers
             lar    ar3,#xi
5            call   recover_timing    ; interpolate received samples to 6400 Hz ldp    #6                ; switch default data page
             call   equalize          ; equalize response, compensate carrier freq
             call   descram_hst       ; descramble received data
             call   queue_rxd         ; queue it
10           call   update            ; update equalizer taps, carrier loop

*            bit    timeout,b0        ; multiplex the display
*            lacc   #eq_outr
*            xc     1,tc
*            add    #3a0h-eq_outr
15 *         samm   xda
*            add    #1
*            samm   yda intr   17                ; display box lacc   timeout           ; decrement timeout count
20           sub    #1
             sacl   timeout lacc   baud_cnt          ; decrement the baud counter
             sub    #1
             sacl   baud_cnt          ; zero?
25           cc     sporadic,eq       ; yes, execute sporadic tasks
             b      rx_seqnc          ; sequence receiver state

*       Routines which advance sequence

*       If etn > fixed threshold, energy detect is true,
*       then if etn < previous etn, AB -> CD has been detected.

30  detect_abcd
             lacc   etn2              ; previous power exceeds fixed threshold?
             sub    #320              ; (depends on AGC setting)
             bcnd   ndetect,lt        ; no, continue lacc   etn2              ; previous power exceeds current level?
```

84

```
                sub    etn1
                bcnd   clrtap,geq          ; yes, power level is now decaying
                                           ; zero the equalizer taps
        ndetect
5               lamm   rxseqp              ; no, set sequence pointer to try again
                sub    #2
                samm   rxseqp
                ret                        ; *debug* lacc   timeout             ; timed out?
10              sub    blank_cnt
                retc   gt                  ; no, try again pop                        ; yes, abort micro-sequencer
                b      rxhsfch             ; try to detect AB again

*       Begin forced training 15      force_trn                          ; force train receiver
                splk   #trnhst,train_vect  ; signal train splk   #ealfaft,eq_alpha   ; enable equalizer tap update
                splk   #calfac,c_alpha     ; cold carrier loop gain
                splk   #cbetac,c_beta1
20      *       splk   #jalfah,j_alpha     ; hot jitter tracker loop gain
        *       splk   #16,j_step ldp    #7                  ; turn on AGC system
                splk   #360,agc_reload     ; set AGC sample count = 3·bc
                splk   #91,prescal         ; AGC prescaler = 32768/(3·bc)
25              dmov   agc_reload lacl   #5                  ; enable AGC low pass filter, α = 1/32
                sacl   agc_alpha
                sach   agc_inth            ; zero the AGC integrator
                sach   agc_intl 30              splk   #thresh_47,agc_thresh    ; set AGC carrier present threshold

*       splk   #8,updb_reload      ; reduce b_time update rate
        *       dmov   updb_reload         ; (install to save run time)

arm_detect                         ; dummy routine to arm AB -> CD detector
                ret
```

* Turn down equalizer gain, train baud loop

```
baud_trn
        splk    #ealfah,eq_alpha    ; set hot equalizer α
        ret
```

* End forced training of equalizer

```
end_force
        lacl    #0                  ; stop training
        sacl    train_vect sach    eye_inth            ; zero eye scatter integrator
        sacl    eye_intl splk    #120,baud_cnt       ; begin sporadic tasks
        ret
```

* Cool off baud loop, continue equalizer train

```
eq_trn
        ldp     #7
        splk    #balfac,b_alpha     ; set final baud loop α
        splk    #bbetac,b_beta1     ; set final baud loop β1
        ret
```

* Switch equalizer gain to track mode

```
track
        splk    #ealfac,eq_alpha    ; set final equalizer α
        splk    #calfac,c_alpha     ; cold carrier loop gain
        splk    #cbetac,c_beta1
*       splk    #jalfac,j_alpha     ; cold jitter tracker loop gain
*       splk    #1,j_step
        ret
```

* Restore data flow after rate switch

```
restore
        lacl    #rx_data_on
        call    queue_status lar     ar1,#sysflg
        opl     #orxd,*             ; unclamp rxdata
```

86

```
                ret

*  ┌─────────────────────────────────────────────────────┐
      *  ║           HSTbis FORWARD CHANNEL DEMODULATOR        ║
      *  └─────────────────────────────────────────────────────┘

5    *   Demodulate to baseband using approximate 1920 Hz carrier (at
      *   local crystal frequency) and generate complex signal components.

demod_hsfch
                lacc    rxcarr
                sub     #2                      ; update carrier VCO
10              sacl    rxcarr
                xc      2,eq
                splk    #10,rxcarr
                add     #carrier_tab            ; offset to cosine/sine table
                lar     ar1,#tempx+380h
15              rpt     #1
                tblr    *+                      ; read carrier phase components lar     ar1,#rint_imag+4        ; advance receiver interpolator
                rpt     #9                      ;   to accept new sample
                dmov    *-
20              dmov    * lar     ar0,#6
                lt      rx_re                   ; calculate real sample
                mpy     tempx
                ltp     rx_im
25              mpy     tempy
                mpya    tempx                   ; acc = cos($\phi$)·rx_re + sin($\phi$)·rx_im
                add     one,14                  ; correct for truncation
                sach    *0+,1 ltp     rx_re                   ; calculate imaginary sample
30              mpy     tempy
                spac                            ; acc = cos($\phi$)·rx_im - sin($\phi$)·rx_re
                add     one,14                  ; correct for truncation
                sach    *0-,1
                ret
```

```
*  ┌─────────────────────────────────────────────────────────┐
*  │              DETECT WINK IN SIGNAL LEVEL                │
*  └─────────────────────────────────────────────────────────┘

*       If the power level has dropped to 1/8 of the average mean-square
5        *       power, a wink has occured.

*       Note: If wink occurs in the first AGC half-interval, the AGC
         *       bumper is hit, but wink is detected in the second half-interval.
         *       If wink occurs in the second AGC half-interval, the AGC bumper
         *       is not hit, and wink is detected in the next half-interval.

10       detect_wink                    ; dp = 7
              lacc   agc_cnt            ; AGC count zero?
              bcnd   full_agc,eq        ; yes, AGC integrator is full (50 msec)

sub    #360/2             ; half full (25 msec)?
              retc   neq                ; no, exit 15            lacc   agc_inth,16        ; get energy from first half-interval
              adds   agc_intl
              sach   wink_msh           ; copy it to wink_ms
              sacl   wink_msl
              b      test_half 20       full_agc
              lacc   agc_inth,16        ; get energy from second half-interval
              adds   agc_intl
              sub    wink_msh,16
              subs   wink_msl 25       test_half
              sacb
              lacc   agc_msh,16         ; compare with 1/16 of mean square energy
              adds   agc_msl
              bsar   4
30            sbb                       ; less than 1/8th mean square power?
              retc   lt                 ; no, wink is not detected lar    ar1,#train_vect    ; forced training?
              lacc   *
              retc   neq                ; yes, ignore wink 35            lacl   #got_wink          ; tell supervisor we saw a wink
``` b    queue_status

```
|  EXECUTE SPORADIC TASKS  |
```

```
5    sporadic
         splk    #120,baud_cnt     ; reload baud counter
         call    eye_test          ; check eye quality
         call    bleed_taps        ; bleed equalizer taps
         call    bleed_jres        ; bleed jitter tracker resonant frequency
10       ret                       ; on exit, dp = 6
```

```
|  INITIALIZATION ROUTINES  |
```

*    Initialize HSTbis backchannel transmitter

```
15   init_txhsbch
         lar     ar1,#bcne_an      ; zero tx/ec symbol delays
         rptz    #(bcaicdly+bcnelen+bcfelen)*2-1
         sacl    *+ ldp     #7                ; initialize page 7 variables:
20       sacl    txtcnt            ; zero T interval count, (to accept new seqnc)
         sacl    txnep             ; init near end pointer for bulk delay
         sacl    tx_z              ; zero transmit preemphasis memory
         sacl    echo_cnt          ; hold off echo canceler
         sacl    ne_alpha          ; freeze echo canceler taps
25       sacl    fe_alpha splk    #213,txfedly      ; *debug* - delay = 200 msec splk    #txhsbch,txvect   ; init transmit sample vector bd      tx_seqnc          ; generate first symbol, set tap update gains
         splk    #txzero_hsbch,txnseq ; transmit zero 30   clear_hsbch_ectaps
         lar     ar1,#bcner_hi     ; zero ec high taps
         rptz    #(bcnelen+bcfelen)*18-1
         sacl    *+
```

```
            lar    ar1,#bcner_lo       ; zero ec low taps
            rpt    #(bcnelen+bcfelen)*18-1
            sacl   *+
            ret 5    *  ┌─────────────────────────────────────────────────────────┐
      *  │      BACKCHANNEL TRANSMITTER AND ECHO CANCELER          │
      *  └─────────────────────────────────────────────────────────┘

*   This routine runs once per sample time at 9600 Hz.  It generates
      *   a transmit sample returns a complex passband receiver sample.
10    *   The next half symbol is generated every ninth sample.

txhsbch
            lacc   txvcoh,16           ; update carrier VCO (φ)
            adds   txvcol
            add    #27307,14           ; 1000Hz
15          sach   txvcoh
            sacl   txvcol
            calld  cos_sin             ; get carrier phase components
            lar    ar1,#txcos

*   Filter transmit symbols and modulate with carrier frequency
20    *   txout = RE{[Σ(an·ck) + j·Σ(bn·ck)]·[cos(φ) + j·sin(φ)]}
      *         = cos(φ)·Σ(an·ck) - sin(φ)·Σ(bn·ck)

lacc   #bchtx_coef         ; index into transmit baseband coefficients
            add    txindx,2            ; 6·txindx
            add    txindx,1
25          samm   bmar lar    ar1,#bcne_an        ; point to real symbol delay
            zap
            rpt    #5                  ; calc real output
            mads   *+
30          mpya   zero                ; zero P reg & accumulate product
            add    one,8               ; correct for truncation
            sach   tempx,7             ; acc = Σ(an·ck)

adrk   #(bcne_bn-bcne_an)-6 ; point to imaginary symbol delay
            lacc   one,8               ; correct for truncation
35          rpt    #5                  ; calc imaginary output
            mads   *+
            lta    tempx
```

90

```
               sach   tempy,7              ; acc = Σ(bn·ck)

mpy    txcos                ; cos(φ)·Σ(an·ck)
               ltp    tempy
               mpy    txsin                ; sin(φ)·Σ(bn·ck)
5              spac                        ; acc = cos(φ)·Σ(an·ck) - sin(φ)·Σ(bn·ck)
               sach   txout,1              ; save transmitter output lt     txout
               mpy    #1607                ; master gain adjust, -15.5dB
               calld  scale                ; add transmit sample to I/O queue
10             pac
               sach   txout,3 spm    2                    ; gain of 2^3 for convolutions

*      Estimate near end backchannel echo
        *      ne_out = Σ[(an + j·bn)·(ner + j·nei)]
15      *             = Σ(an·ner) - Σ(bn·nei) + j·[Σ(an·nei) + Σ(bn·ner)]

lacc   #bcner_hi+1800h      ; index into near end ec coefficients
               add    txindx,4             ; 2·bcnelen·txindx
               add    txindx,3
               sacl   tempz                ; save addr of real coefficients
20             add    #bcnelen
               samm   bmar                 ; save addr of imag coefficients lar    ar1,#bcne_bn+bcaicdly+bcnelen-1
               zap
               rpt    #bcnelen-1           ; near end real echo convolution
25             mads   *-
               mpya   zero                 ; zero P reg & accumulate product
               sacb                        ; accb = Σ(bn·nei)

sbrk   #bcaicdly
               lacc   one,10               ; correct for truncation
30             rpt    #bcnelen-1           ; near end imaginary echo convolution
               mads   *-
               mpya   zero                 ; acc = Σ(an·nei)

lmmr   bmar,#tempz+380h     ; switch to real coefficients
               adrk   #bcaicdly+bcnelen*2
35             rpt    #bcnelen-1
               mads   *-
```

91

```
             apac
             sach    ec_im,5              ; acc = Σ(an·nei) + Σ(bn·ner)

sbrk    #bcaicdly
             lacc    one,10               ; correct for truncation
 5           rpt     #bcnelen-1
             mads    *-
             apac
             sbb
             sach    ec_re,5              ; acc = Σ(an·ner) - Σ(bn·nei)

10    *   Estimate far end backchannel echo
      *   fe_out = Σ[(an + j·bn)·(fer + j·fei)]
      *          = Σ(an·fer) - Σ(bn·fei) + j·[Σ(an·fei) + Σ(bn·fer)]

.if     0
             lacc    #bcfer_hi+1800h      ; index into far end ec coefficients
15           add     txindx,5             ; 2·bcfelen·txindx
             add     txindx,2
             sacl    tempz                ; save addr of real coefficients
             add     #bcfelen
             samm    bmar                 ; save addr of imag coefficients 20           lar     ar1,#bcfe_bn+bcfelen-1  ; far end real echo convolution
             zap
             rpt     #bcfelen-1
             mads    *-
             mpya    zero                 ; zero P reg & accumulate product
25           neg                          ; acc = - Σ(bn·fei)

lmmr    bmar,#tempz+380h     ; switch to real coefficients
             rpt     #bcfelen-1
             mads    *-
             mpya    zero                 ; acc = Σ(an·fer) - Σ(bn·fei)
30           add     one,10               ; correct for truncation
             add     ec_re,11             ; include near end echo
             sach    ec_re,5              ; save real echo estimate adrk    #bcfelen*2           ; far end imaginary echo convolution
             lacc    one,10               ; correct for truncation
35           rpt     #bcfelen*2-1
             mads    *-
             apac                         ; acc = Σ(an·fei) + Σ(bn·fer)
             add     ec_im,11             ; include near end echo
```

```
            sach    ec_im,5         ; save imaginary echo estimate
            .endif spm     1               ; restore product mode

*   Cancel near and far end echoes by modulating estimates by transmit
5   *   carrier and adding to the dc blocked complex receiver sample.

call    fast_hilbert    ; phase split the receiver sample lt      ec_re           ; modulate real echo estimate
            mpy     txcos
            ltp     ec_im
10          mpy     txsin
            mpys    txcos           ; acc = cos(φ)·ec_re - sin(φ)·ec_im
            add     one,14          ; correct for truncation
            add     rx_re,15
            sach    rx_re,1         ; save echo cancelled receiver sample 15          lacc    one,14          ; correct for truncation
            lta     ec_re           ; modulate imaginary echo estimate
            mpy     txsin
            lta     rx_re           ; acc = cos(φ)·fe_im + sin(φ)·fe_re
            add     rx_im,15
20          sach    rx_im,1         ; save echo cancelled receiver sample

*   Calculate echo canceler error signal.
    *   Demodulate echo canceled signal to transmitter baseband.

mpy     txcos           ; calculate real echo error
            ltp     rx_im
25          mpy     txsin
            mpya    txcos           ; acc = cos(Θ)·rx_re + sin(Θ)·rx_im
            add     one,14          ; correct for truncation
            sach    ec_errr,1       ; save real echo error signal ltp     rx_re           ; calculate imaginary echo error
30          mpy     txsin
            lts     ne_alpha        ; acc = cos(Θ)·rx_im - sin(Θ)·rx_re
            add     one,14          ; correct for truncation
            sach    ec_erri,1       ; save imaginary echo error signal
```

```
                    NEAR END ECHO CANCELER TAP UPDATE

*        ner(n) = ner(n) - α·errr·a(n) - α·erri·b(n)
5  *        nei(n) = nei(n) + α·errr·b(n) - α·erri·a(n)

lacc    one,12                  ; correct for truncation
            mpy     ec_errr                 ; scale error by α
            mpya    ec_erri                 ; acc = near α·errr, P reg = near α·erri
            sach    tempx,3                 ; tempx = near α·errr
10          ltp     tempx
            add     one,12
            sach    tempy,3                 ; tempy = near α·erri lacc    txindx,4                ; index into near end taps
            add     txindx,3
15          samm    indx lar     ar1,#bcner_hi           ; ar1,ar2 = real tap
            lar     ar2,#bcner_lo
            lar     ar3,#bcnei_hi           ; ar3,ar4 = imaginary tap
            lar     ar4,#bcnei_lo
20          mar     *0+,2
            mar     *0+,3
            mar     *0+,4
            mar     *0+,5
            lar     ar5,#bcne_an+bcaicdly+bcnelen-1    ; ar5 = real symbol
25          lar     ar6,#bcne_bn+bcaicdly+bcnelen-1    ; ar6 = imaginary symbol lacl    #bcnelen-1              ; update near end taps
            samm    brcr
   *        spm     2                       ; increase gain by 2^3 during near end train mpy     *,1                     ; mult α·errp·an
30          rptb    nedp-1 lacc    *,16,2                  ; load real tap
            adds    *,6
            lts     tempy                   ; acc = tap - α·errp·an
            mpy     *,5                     ; mult α·errq·bn
35          mpys    *-,1                    ; mult α·errq·an
            sach    *+,0,2                  ; acc = tap - α·errp·an - α·errq·bn
            sacl    *+,0,3                  ; store real tap
```

```
           lacc    *,16,4           ; load imaginary tap
           adds    *,6
           lts     tempx            ; acc = tap - α·errq·an
           mpy     *-,5             ; mult α·errp·bn
 5         mpya    *,3              ; mult α·errp·an
           sach    *+,0,4           ; acc = tap - α·errq·an + α·errp·bn
           sacl    *+,0,1           ; store imaginary tap
     nedp
    *      spm     1                ; restore product mode 10  *  ┌──────────────────────────────────────────────────────────────┐
    *  ║          FAR END ECHO CANCELER TAP UPDATE                    ║
    *  └──────────────────────────────────────────────────────────────┘

*      fer(n) = fer(n) - α·errr·a(n) - α·erri·b(n)
    *      fei(n) = fei(n) + α·errr·b(n) - α·erri·a(n)

15         .if     0
           lt      fe_alpha         ; scale far end error by α
           lacc    one,12           ; correct for truncation
           mpy     ec_errr
           mpya    ec_erri          ; acc = far α·errr, P = far α·erri
20         sach    tempx,3          ; tempx = far α·errr
           ltp     tempx
           add     one,12
           sach    tempy,3          ; tempy = far α·erri lacc    txindx,5         ; index into far end taps
25         add     txindx,2
           samm    indx lar     ar1,#bcfer_hi    ; ar1,ar2 = real tap
           lar     ar2,#bcfer_lo
           lar     ar3,#bcfei_hi    ; ar3,ar4 = imaginary tap
30         lar     ar4,#bcfei_lo
           mar     *0+,2
           mar     *0+,3
           mar     *0+,4
           mar     *0+,5
35         lar     ar5,#bcfe_an+bcfelen-1    ; ar5 = real symbol
           lar     ar6,#bcfe_bn+bcfelen-1    ; ar6 = imaginary symbol lacl    #bcfelen-1       ; update far end taps
           samm    brcr
```

```
                mpy     *,1              ; mult α·errp·an
                rptb    fedp-1 lacc    *,16,2           ; load real tap
                adds    *,6
5               lts     tempy            ; acc = tap - α·errp·an
                mpy     *,5              ; mult α·errq·bn
                mpys    *-,1             ; mult α·errq·an
                sach    *+,0,2           ; acc = tap - α·errp·an - α·errq·bn
                sacl    *+,0,3           ; store real tap 10              lacc    *,16,4           ; load imaginary tap
                adds    *,6
                lts     tempx            ; acc = tap - α·errq·an
                mpy     *-,5             ; mult α·errp·bn
                mpya    *,3              ; mult α·errp·an
15              sach    *+,0,4           ; acc = tap - α·errq·an + α·errp·bn
                sacl    *+,0,1           ; store imaginary tap
        fedp
                .endif

*       Check if transmit symbol needs to be updated.

20              lacc    txindx           ; update tap index
                add     #1
                sacl    txindx
                sub     #9               ; new symbol required?
                retc    lt               ; no, exit back channel tx/ec 25      *       Add half symbol to the delay line as soon as the transmitter has
        *       space available.

lar     ar1,#bcfe_bn+bcfelen-2  ; update symbol delay lines
                rpt     #(bcaicdly+bcnelen+bcfelen)*2-2
                dmov    *-

30              splk    #0,txindx        ; zero tap index
```

SYMBOL RATE COMMAND SEQUENCER

* A new sequence is executed when the symbol interval T count has
35 * decremented to zero.

```
         tx_seqnc
                 lacl    #3              ; default data is marks
                 sacl    txdata
                 lacl    txtcnt          ; T count zero?
5                bcnd    reenter,neq     ; no, reenter command in progress lacl    txnseq          ; new sequence ready?
                 bcnd    reenter,eq      ; no, reenter command in progress

*   Begin execution of a sequence
         *   Save the parameter, init T count, and branch to the subroutine 10               sach    txnseq          ; indicate new sequence accepted
                 lar     ar1,#txrvec
                 rpt     #2
                 tblr    *+              ; get subroutine addr, parameter, T count
                 add     #3
15               sacl    txseqp          ; save pointer to next element reenter
                 lacc    txrvec          ; branch to the subroutine
                 bacc

*   Sequence lists
20       *   structure: subroutine addr, immediate parameter or pointer, T count txzero_hsbch                    ; transmit zero using the backchannel
                 .word   txzero,0,1
                 .word   0 trn_hsbch                       ; HSTbis originate training sequence
25               .word   patt,0202h,36   ; 36T of AB
                 .word   patt,3131h,4    ; 4T of CD
                 .word   quadtrn,2,8192  ; TRN2
                 .word   mark_bc,0,8192  ; B1
                 .word   0

30       *       .word   tone,0231h,1067 ; 1267 Hz
         *       .word   txzero,0,24     ; ≥16T of zero
         *       .word   tone,0132h,1067 ; 733 Hz
         *       .word   txzero,0,24     ; ≥16T of zero

*init_retrn                     ; initiate forward channel retrain
35       *       .word   retrn_tone,2,30 ; send 400/450Hz tone for 100 msec
```

97

```
       *      .word retrain,0,1       ; restart forward channel receiver
       *      .word 0

*reversal
       *      .word txzero_fc,0,60    ; wink for 25 msec
5      *      .word start_rxhst,0,15  ; start forward channel receiver
       *      .word 0                 ; continue wink for 50 msec using bch

*
       *  ╔══════════════════════════════════════════════════════╗
       *  ║  HSTbis BACKCHANNEL TRANSMITTER SYMBOL GENERATOR     ║
       *  ╚══════════════════════════════════════════════════════╝

10     *      Transmit an alternating pattern, AC, CA, AA, CC, AB, CD patt
              lacc    txtcnt,2        ; get two lsb's of T count
              sub     #4
              samm    treg1           ; T reg = 12,8,4,0,...
15            lacc    txparm
              satl
              and     #0fh
              sacl    txdata          ; save transmit data
              b       cmdx 20            splk    #0111011b,scramh    ; init scrambler for quick train
              splk    #1011101110110110b,scraml

*      Transmit four-phase scrambled marks, (txparm) = # scrambler bits quadtrn                        ; quadphase TRN2 for HSTbis
              splk    #1024,ne_alpha  ; *debug*

25            lacl    #2              ; set number of scrambler bits
              sacl    txnbit
              lacl    #3
              sacl    txmask
              splk    #0,scramh       ; init scrambler
30            splk    #0,scraml       ; ACCBDDCBBD...
              lacl    #0
              sacl    estate
              splk    #$+2,txrvec     ; reenter here call    scram_hsbch     ; scramble marks
35            bd      cmdx
```

```
                lacc    txdata              ; skip diff encoding during TRN sequence.
                sacl    estate              ;  but save the encoder state

*      Transmit 16 bit pattern at 1067 bps pat16                               ; common 16-bit pattern entry point
5               splk    #$+2,txrvec         ; reenter here lacl    txtcnt              ; complete any 8-symbol sequence
                nop
                xc      2,eq                ; T count = zero?
                splk    #8,txtcnt           ; yes, set it to 8

10              lacl    txpatt              ; align dibit
                sfl
                sfl
                sach    tempz
                or      tempz
15              sacl    txpatt              ; save rotated data
                sfr                         ; reverse 2 lsb's for shift right scrambler
                and     one
                add     txpatt,1
                sacl    txdata              ; save data to transmit 20              call    scram_hsbch         ; scramble data
                call    grayenc             ; gray and differential encode
                b       cmdx                ; exit command

*      Start forward receiver during line turn around after 25 msec of wink

*start_rxhst
25       *      pop                         ; discard return address
         *      call    init_txhsbch        ; initialize backchannel transmitter
         *      call    start_txhsbch       ; generate a sample to transmit
         *      b       rx_hst              ; start forward channel receiver

*      Restart forward channel receiver after sending 100 msec of tone

30       *retrain
         *      pop                         ; discard return address
         *      call    _bc                 ; begin xmit backchannel retrain
         *      lar     ar1,#sysflg         ; clamp tx/rx data
         *      apl     #arxd&atxd&acarr,*  ; disallow "no carrier" message
35       *      b       rx_hst              ; restart forward channel receiver
```

99

```
*       Transmit marks at speed until data arrives (B1)

mark_bc                         ; transmit marks at selected rate
                lacl    #5
                sacl    txmark          ; set SDLC marks count
5               sach    txbindx         ; clear data buffer
                sach    txdbuf
                splk    #get_data,txd_vect  ; set transmit data source lacl    #tx_data_on     ; indicate transmit data on
                call    queue_status 10              lar     ar1,#sysflg     ; unclamp tx data
                opl     #otxd,*         ; (actually controlled by T count)

splk    #$+2,txrvec     ; reenter here

*       Transmit uncoded data lacc    txtcnt
15      *       cc      get_txd,eq      ; unclamp data after B1 period
                call    scram_hsbch     ; scramble data
                call    grayenc         ; gray and differential encode

*
        *  ║           COMMON COMMAND EXIT                          ║
20      *  ╚═══════════════════════════════════════════════════════╝ cmdx
        *       lacc    echo_cnt        ; training count zero?
        *       bcnd    quesym,eq       ; yes, skip
        *       sub     #1              ; no, decrement count
25      *       sacl    echo_cnt
        *       cc      ecseq,eq        ; sequence the echo canceler lacc    txrvec          ; save reentry vector
                sacl    hsrvec
                splk    #zero_sym,txrvec ; zero stuff next symbol 30      *  Queue symbol code in far end bulk delay quesym
                lacl    txnep           ; queue rapped low (txnep = 0)?
                sub     #1
```

100

```
            lar     ar0,#delay_base    ; ar0 = base addr of circular queue
            xc      2,lt               ; no, skip
            lacc    #maxdel+1          ; yes, set pointer to maximum
            sacl    txnep              ; save near end pointer
5           sfr                        ; odd => carry set
            sacl    tempx
            lar     ar1,tempx          ; calc index
            mar     *0+
            lacc    txdata,8           ; shift odd symbol code to high byte
10          xc      2,nc               ; even? no, skip
            bsar    8
            or      *                  ; include even symbol code
            sacl    *                  ; queue it

*       Remove delayed symbol code from far end bulk delay 15          lacl    txnep              ; form far end pointer
            adds    txfedly
            sub     #maxdel+2          ; queue rapped high?
            xc      2,lt               ; yes, pointer already adjusted
            add     #maxdel+2          ; no, restore pointer
20          sfr                        ; odd => carry set
            sacl    tempy
            lar     ar1,tempy          ; calc index
            mar     *0+
            lacc    *,1                ; get symbol code
25          xc      1,c
            bsar    8                  ; position high byte
            and     #0ffh,1            ; mask byte

*       Transmit symbol table lookup

*       On exit, near end (bcne_an0, bcne_bn0) and far end
30  *       (bcfe_an0, bcfe_bn0) complex transmit symbols have been updated
    *       and echo canceler loop gains have been adjusted.

lar     ar0,#bcfe_bn-bcfe_an ; ar0 = pointer offset
            lar     ar1,#bcfe_an       ; ar1 = destination addr
            add     #hsbch_symtab      ; add symbol table base addr
35          rpt     #1
            tblr    *0+                ; lookup bcfe_an0, bcfe_bn0 lar     ar0,#bcne_bn-bcne_an
            lar     ar1,#bcne_an
```

```
              lacc    txdata,1            ; acc = (transmit symbol code)·2
              add     #hsbch_symtab       ; add symbol table base addr
              rpt     #1
              tblr    *0+                 ; lookup bcne_an0, bcne_bn0
  5           ret

*       Transmit band edge tone, either 733.3 Hz or 1266.7 Hz
      *       (add/subtract 90° every T/2)
      *       twice as many symbols => use half amplitude points tone
 10           lacc    txtcnt,2            ; get two lsb's of T count
              sub     #4
              samm    treg1               ; T reg = 12,8,4,0,...
              lacc    txparm
              satl
 15           and     #0fh
              calld   quesym              ; queue symbol in far end bulk delay
              add     #4                  ; add symbol code offset
              sacl    txdata              ; save transmit data
              b       advance_tcnt 20   *       Zero stuff symbol delay line every other time
      *       (This is for compatibility with the tone generator.)

zero_sym
              lacc    hsrvec              ; return to symbol generator next time
              sacl    txrvec 25   *       Transmit zero in backchannel txzero
              calld   quesym              ; queue symbol in far end bulk delay
              lacl    #8                  ; place zeros in the symbol delay every T/2
              sacl    txdata 30   *       Decrement the symbol interval T count and if greater than zero
      *       exit, else continue execution of a sequence in progress,
      *       else zero T count so that a new command may be interpreted.

advance_tcnt
              lacl    txtcnt              ; decrement T count
 35           sub     #1                  ; > zero?
              sacl    txtcnt
```

102

```
        retc  gt              ; yes, exit txec lacl  txseqp
        sach  txtcnt           ; zero T count
        tblr  tempx            ; get subroutine addr
5       sacb
        lacc  tempx            ; zero?
        retc  eq               ; yes, end of sequence, exit txec sacl  txrvec           ; no, save as reentry vector
        lacb
10      add   #1
        tblr  txparm           ; get parameter
        add   #1
        tblr  txtcnt           ; get T count
        retd                   ; exit txec
15      add   #1
        sacl  txseqp           ; save pointer to next element
```

```
*  ┌─────────────────────────────────────────────────┐
*  │          HSTbis TRANSMITTER SUBROUTINES         │
*  └─────────────────────────────────────────────────┘

*    Sequence the echo canceler state 5 ecseq
           lacc    txecmo,2                        ; switch mode
           samm    treg1
           lacc    #2540h                          ; 3 -> 2 -> 5 -> 0
           sath                                    ; 1 -> 4 -> 0 -> 0
10         satl
           and     #0fh
           sacl    txecmo
           sub     #2                              ; mode 2?
           bcnd    check4,neq                      ; no, check for mode 4

15         lacc    txfedly                         ; wait for far end echo of S pattern
           add     #bcfelen-(bcaicdly+bcnelen) ;   to die out before switching modes
           sacl    echo_cnt                        ; ecnt1 = far end training count
           ret check4
20         sub     #2                              ; mode 4?
           retc    neq                             ; no, skip splk    #511,prl_reload                 ; switch to long PRL integrate/dump count
           lar     ar1,#sysflg
           bit     *,#ftxans                       ; answer mode?
25         retc    tc                              ; yes, wait for second train splk    #2400,echo_cnt                  ; switch to mode 0 after 1.0 sec
           ret

*    Gray and differential encoder, txdata = input
   *    On exit, txdata = encoded output 30 *    Least significant two bits of data are gray encoded then
   *    differentially encoded using a combination lookup table.

grayenc
           lacc    txdata,2                        ; acc = Q2 Q1 0 0
           or      estate                          ; or in last state, Y2 Y1
35         and     #0fh                            ; acc = Q2 Q1 Y2 Y1
```

```
            add    #dg4tab        ; index into table
            tblr   estate         ; estate = Y2'Y1'(new)
            retd
            lacc   estate         ; save encoded data
 5          sacl   txdata

*    HSTbis backchannel scrambler (V.22bis), assumes txnbit = 2
     *    On entry, data is in (txdata), dp = 7 scram_hsbch
            lacc   scraml         ; form X^-14
10          bsar   3
            xor    scraml         ; acc = X^-14.xor.X^-17
            xor    txdata         ; acc = data.xor.X^-14.xor.X^-17
            and    txmask         ; isolate scrambled bits
            sacl   txdata
15          lacc   txdata,1       ; include scrambled data
            or     scramh
            sacl   scramh
            lacc   scramh,16      ; shift scrambler right
            adds   scraml
20          bsar   2
            retd
            sach   scramh         ; save scrambler data
            sacl   scraml         ; exit scram_hsbch
```

```
     * ╔══════════════════════════════════════════════════╗
25   * ║            TRANSMIT FILTER COEFFICIENTS          ║
     * ╚══════════════════════════════════════════════════╝ assign .macro   k0,k1,k2,k3,k4,k5,k6,k7,k8
            .asg   0,y
            .loop  9
30          .eval  k:y:,kc:x:
            .eval  x+1,x
            .eval  y+1,y
            .endloop
            .endm 35   *    HSTbis backchannel transmit FIR filter
     *    fs = 9600 Hz, 54 taps, ß = 5, fc = 310 (-6 dB), dc gain = 18

.mnolist
            .asg   0,x
```

105

```
             assign  -127,-217,-332,-467,-611,-748,-858,-914,-888
             assign  -749,-465,-9,642,1502,2577,3859,5328,6951
             assign  8683,10466,12239,13931,15473,16800,17852,18581,18955 bchtx_coef
5               .word  kc0,kc9,kc18,kc26,kc17,kc8
                .word  kc1,kc10,kc19,kc25,kc16,kc7
                .word  kc2,kc11,kc20,kc24,kc15,kc6
                .word  kc3,kc12,kc21,kc23,kc14,kc5
                .word  kc4,kc13,kc22,kc22,kc13,kc4
10              .word  kc5,kc14,kc23,kc21,kc12,kc3
                .word  kc6,kc15,kc24,kc20,kc11,kc2
                .word  kc7,kc16,kc25,kc19,kc10,kc1
                .word  kc8,kc17,kc26,kc18,kc9,kc0

*       HSTbis backchannel symbol table 15      hsbch_symtab
                .word  128,128       ; A
                .word  128,-128      ; D
                .word  -128,128      ; B
                .word  -128,-128     ; C
20              .word  81,81         ; A     -4.0dB points for tone
                .word  81,-81        ; D
                .word  -81,81        ; B
                .word  -81,-81       ; C
                .word  0,0           ; zero 25              .end
```

A preferred embodiment of the present invention has been described herein. It is to be understood, of course, that changes and modifications may be made in the embodiment without departing from the true scope and spirit of the present invention, as defined by the appended claims.

We claim:

1. A method for retraining a data communication link between a local and remote modem, said communication link having a high speed and low speed channel, said high speed channel having a bandwidth in a first range of frequencies and said low speed channel having a bandwidth in a second range of frequencies that partially overlaps with the first range of frequencies, said local modem having a high speed transmitter, an echo canceller, and a low speed receiver and said remote modem having a low speed transmitter and a high speed receiver, wherein said high speed transmitter is transmitting data over said high speed channel to said high speed receiver, said method comprising the steps of:

sending a signal from said local modem signaling said high speed receiver to put said receiver in a state in which it is ready to be trained;

sending a command from said remote modem to said high speed transmitter over one of said channels which causes said transmitter to stop transmitting data;

initializing said remote modem to ready said modem for training;

training said high speed receiver of said remote modem;

resuming transmission of the data from said high speed transmitter to said high speed receiver over one of said channels, a signal emanating from said high speed transmitter being partially reflected back to said local modem, said reflected signal defining a reflected signal bandwidth; and cancelling a portion of said reflected signal bandwidth.

2. A method of claim 1 further comprising the step of estimating a round trip delay from the low speed transmitter.

3. A method of claim 1 wherein the reflected signal bandwidth overlaps substantially with said second range of frequencies.

4. A method of claim 1 wherein, when the local modem is transmitting over said high-speed channel, said echo canceller cancels only a portion of the reflected signal bandwidth that falls within the second range of frequencies.

5. In an asymmetrical data communication system having a local modem at one end of a transmission link and a remote modem at the other end of said link, said link having a high speed forward channel and a low speed reverse channel, said local modem having a local transmitter, local receiver, and a local echo canceler, said remote modem having a remote transmitter, a remote receiver and a remote echo canceler, a method for reversing the direction of transmission, said method comprising the steps of:

training said local and remote receiver, said local and remote transmitter and said local and remote echo canceler to place each in an initial train state which allows said local modem to properly transmit data to said remote modem over said high speed forward channel and receive data from said remote modem over said low speed reverse channel;

storing the initial train state of said local receiver, said local transmitter and said local echo canceler at said local modem;

storing the initial train state of said remote receiver, said remote transmitter, and said remote echo canceler at said remote modem;

transmitting data from said local modem over said high speed forward channel to said remote modem and receiving data from said remote modem over said low speed reverse channel;

generating a signal from said remote modem signaling said local and remote modems to reverse the direction of the high speed transmission;

performing a second full train of said local and remote receiver, said local and remote transmitter and said local and remote echo canceler to place each in a second train state which allows said remote modem to properly transmit data to said local modem over said high speed forward channel and accurately receive data from said local modem over said low speed reverse channel;

storing the second train state of said local receiver, said local transmitter and said local echo canceler at said local modem;

storing the second train state of said remote receiver, said remote transmitter and said remote echo canceller at said remote modem;

transmitting data from said remote modem over said high speed forward channel to said local modem while said remote modem is receiving data from said local modem over said low speed reverse channel;

signaling said local and remote modems to reverse the direction of the high speed transmission; and performing a quick train of said local and remote modems which allows said local modem to transmit data to said remote modem over said high speed forward channel and receive data from said remote modem over said low speed reverse channel, whereby said quick train is faster than said first and second trains because said quick train relies on the stored initial state of said local and remote receiver and said local and remote echo canceler.

* * * * *